United States Patent
Kejha et al.

(10) Patent No.: US 12,528,591 B1
(45) Date of Patent: Jan. 20, 2026

(54) AIRCRAFT POWER MODULE AND GROUND HANDLING SYSTEM, METHOD AND APPARATUS

(71) Applicant: Piasecki Aircraft Corporation, Essington, PA (US)

(72) Inventors: Joseph Kejha, Meadowbrook, PA (US); George L. Firpi, Glenolden, PA (US); John W. Piasecki, Bryn Mawr, PA (US); Robert L. Lewis, Wynnewood, PA (US); Fredericak W. Piasecki, Haverford, PA (US)

(73) Assignee: Piasecki Aircraft Corporation, Coatesville, PA (US)

( * ) Notice: Subject to any disclaimer, the term of this patent is extended or adjusted under 35 U.S.C. 154(b) by 587 days.

(21) Appl. No.: 17/583,829

(22) Filed: Jan. 25, 2022

Related U.S. Application Data

(60) Provisional application No. 63/142,194, filed on Jan. 27, 2021.

(51) Int. Cl.
| | |
|---|---|
| *B64D 27/10* | (2006.01) |
| *B64D 27/02* | (2006.01) |
| *B64D 27/24* | (2024.01) |
| *B64D 27/32* | (2024.01) |

(Continued)

(52) U.S. Cl.
CPC ............ *B64D 27/10* (2013.01); *B64D 27/02* (2013.01); *B64D 27/24* (2013.01); *B64D 27/32* (2024.01);

(Continued)

(58) Field of Classification Search
CPC ..... B64U 50/39; B64U 60/30; B64C 2211/00; B64D 27/02; B64D 27/10; B64D 27/244;

(Continued)

(56) References Cited

U.S. PATENT DOCUMENTS

| | | | | |
|---|---|---|---|---|
| 2,815,184 A | * | 12/1957 | Irwin | B64D 27/404 244/54 |
| 3,589,646 A | * | 6/1971 | Mori | B64C 29/0075 244/114 R |

(Continued)

FOREIGN PATENT DOCUMENTS

| | | |
|---|---|---|
| EP | 3263456 | 3/2018 |

*Primary Examiner* — Jason H Duger
(74) *Attorney, Agent, or Firm* — Robert J. Yarbrough of Lipton, Weinberger & Husick

(57) ABSTRACT

An aircraft, such as a rotary-wing aircraft, may be selectably fitted with power modules that may be installed in or removed from corresponding openings in the aircraft fuselage. The power modules may be interchangeable with other power modules, The power modules may utilize different technologies or thermodynamic cycles to generate power, including electrical batteries, fuel cells, a turbine powered generator, a reciprocating engine-powered generator, a turbine engine, a reciprocating engine, or other electrical or mechanical sources of power. The power modules may transfer electrical or mechanical power to the aircraft to maintain the aircraft in flight or to provide propulsion to the aircraft. An aircraft control system may detect the installed power modules and adjust inceptors and displays to correspond to the installed power modules.

23 Claims, 29 Drawing Sheets

(51) Int. Cl.
  *B64D 27/40* (2024.01)
  *B64U 50/39* (2023.01)
  *B64U 60/30* (2023.01)
  *H02J 7/00* (2006.01)

(52) U.S. Cl.
  CPC ........... *B64D 27/40* (2024.01); *B64D 27/402* (2024.01); *B64D 27/404* (2024.01); *B64U 50/39* (2023.01); *B64U 60/30* (2023.01); *B64C 2211/00* (2013.01); *B64D 27/026* (2024.01); *H02J 7/0063* (2013.01); *H02J 2310/44* (2020.01)

(58) Field of Classification Search
  CPC .... B64D 27/026; B64D 27/40; B64D 27/402; B64D 27/404; B64D 27/32; H02J 2310/44; H02J 7/0063
  See application file for complete search history.

(56) References Cited

U.S. PATENT DOCUMENTS

| | | | |
|---|---|---|---|
| 7,234,667 B1 | 6/2007 | Talmadge | |
| 8,657,227 B1 | 2/2014 | Bayliss | |
| 9,493,226 B2 | 11/2016 | Karem | |
| 9,505,484 B1 | 11/2016 | Al-Sabah | |
| 9,745,073 B2 | 8/2017 | Whiteford | |
| 10,046,844 B2 | 8/2018 | Wang | |
| 10,106,269 B1* | 10/2018 | Thornton | B64D 45/00 |
| 10,501,193 B2 | 12/2019 | Oldroyd | |
| 10,618,656 B2 | 4/2020 | Campbell | |
| 10,737,778 B2 | 8/2020 | Oldroyd | |
| 10,766,627 B2 | 9/2020 | Hehn | |
| 10,787,255 B2 | 9/2020 | George | |
| 10,870,479 B2 | 12/2020 | Courtin | |
| 10,998,253 B1 | 5/2021 | Zuo | |
| 11,104,446 B2 | 8/2021 | McCullough | |
| 11,577,846 B2 | 2/2023 | Miftakhov | |
| 2002/0145075 A1* | 10/2002 | Page | B64U 10/20 244/36 |
| 2009/0230243 A1* | 9/2009 | Army | B64C 7/00 244/118.5 |
| 2010/0044515 A1* | 2/2010 | Neto | G01M 1/127 244/135 C |
| 2020/0262579 A1* | 8/2020 | Long | H02B 1/20 |
| 2021/0261260 A1* | 8/2021 | Miftakhov | B64D 33/08 |
| 2022/0177153 A1* | 6/2022 | Cervia | B64C 1/22 |

\* cited by examiner

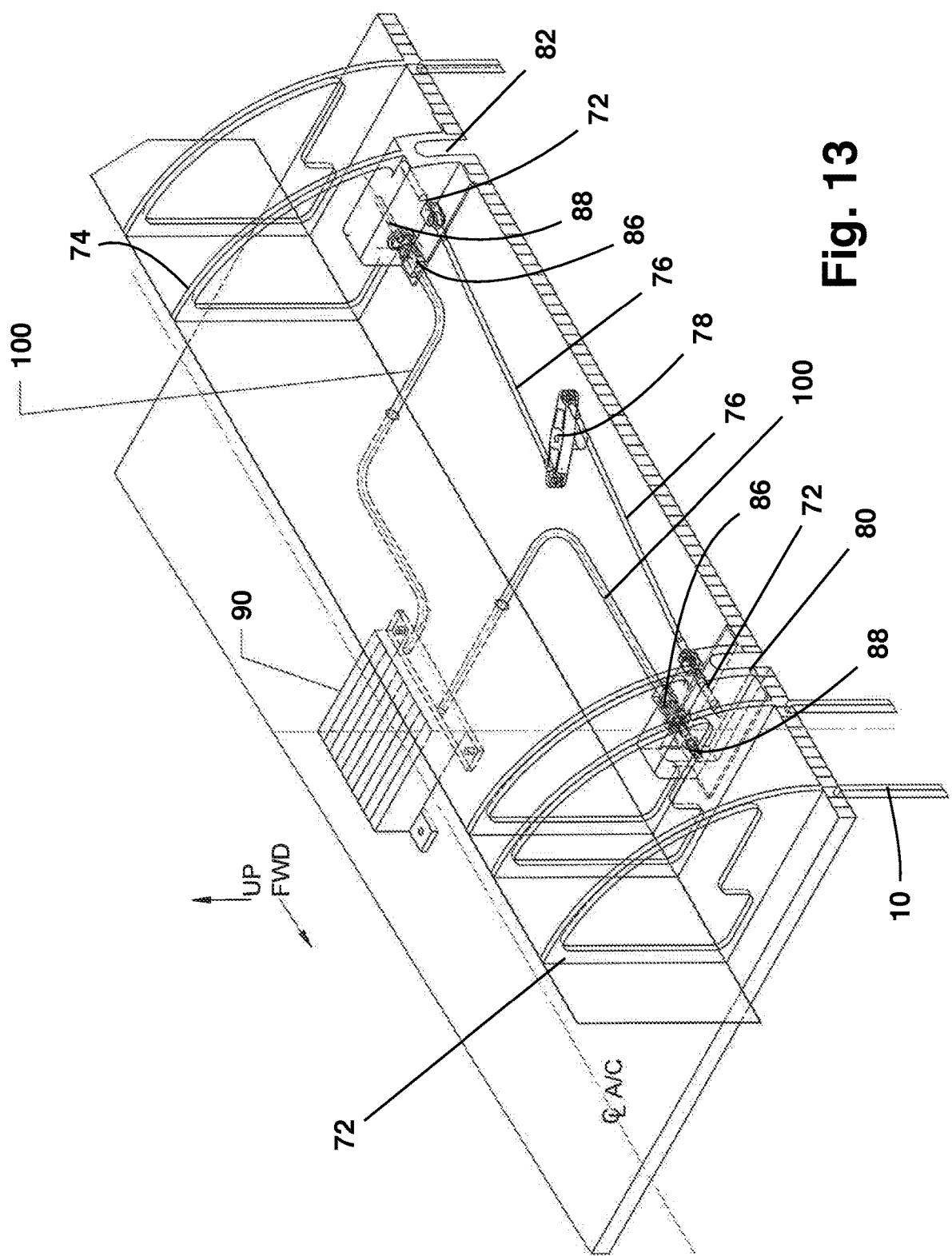

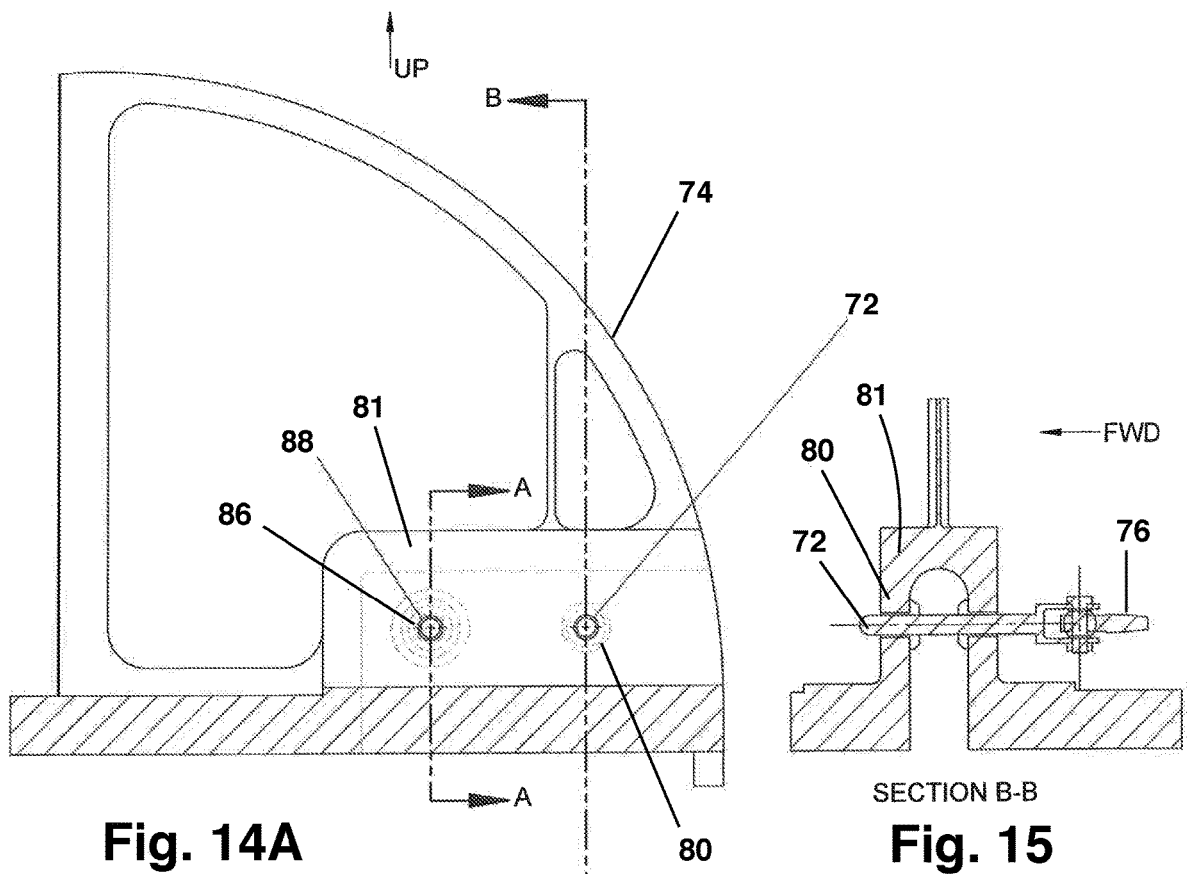
Fig. 14A
Fig. 15
SECTION B-B
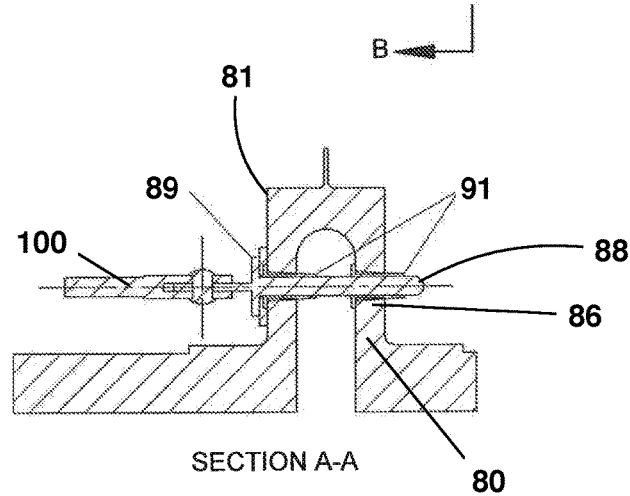
SECTION A-A
Fig. 14B

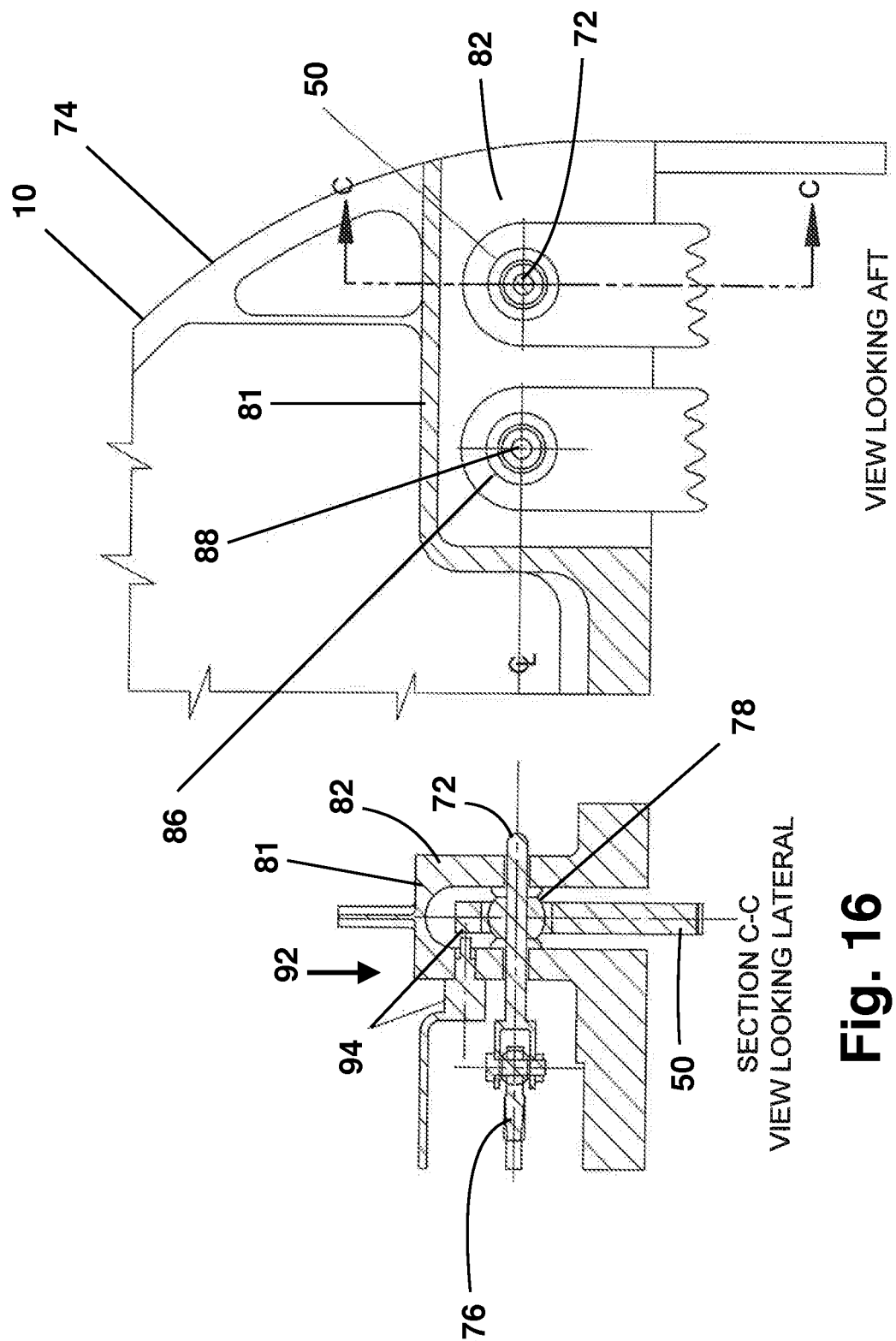

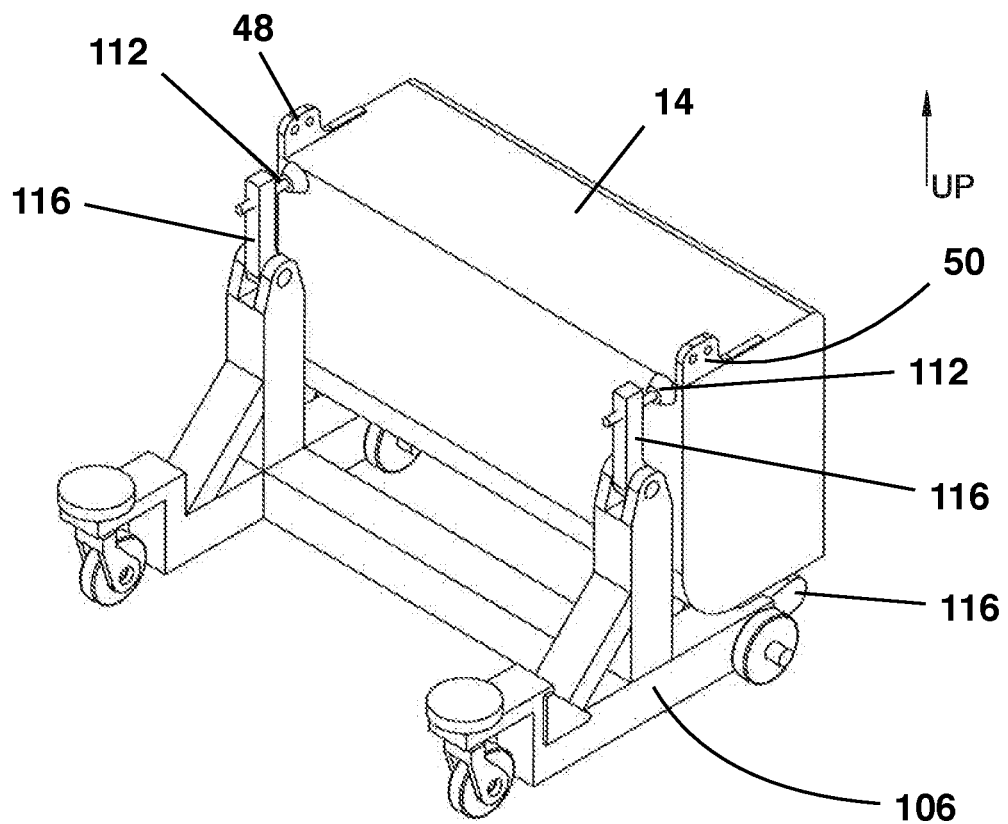
Fig. 24
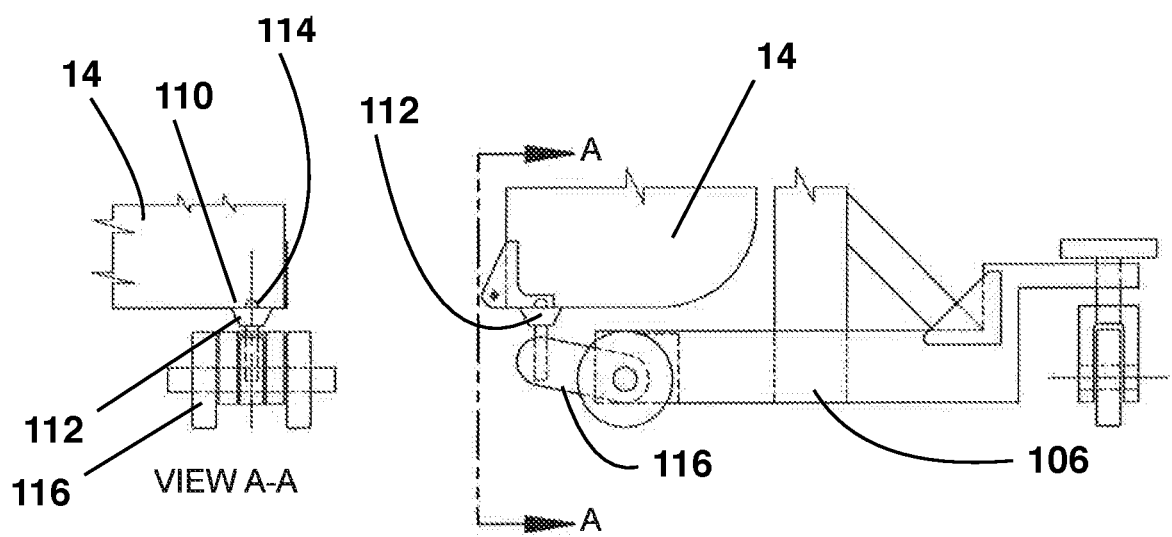
Fig. 25
Fig. 26

AIRCRAFT POWER MODULE AND GROUND HANDLING SYSTEM, METHOD AND APPARATUS

I. BACKGROUND OF THE INVENTION

A. Field of the Invention

The Invention is an apparatus, system and method for powering aircraft with removable and replaceable power modules. The power modules may be interchangeable with other power modules. The interchangeable power modules may produce power using different technologies or thermodynamic cycles. The power modules may provide electrical power stored or generated within the power modules to electric motor(s) on board the aircraft that are configured to turn the drive system of the aircraft. Other power modules may store or generate mechanical power and transfer the mechanical power to the aircraft drive system through a rotating shaft. An aircraft may be configured to accept power both from power modules that generate or store electrical power and power modules that generate or store mechanical power.

The power modules may be attachable and removable from an aircraft fuselage from outside the fuselage without dismantling the fuselage of the aircraft. When installed, the power modules may define a portion of the skin of the aircraft fuselage.

The ground handling system of the Invention is configured to engage and support a power module and to raise the power module into engagement with the aircraft fuselage and to lower the power module out of engagement with the aircraft fuselage.

B. Description of the Related Art

For the purposes of this application, an 'aircraft' is an airborne vehicle of any configuration, including a rotary-wing aircraft, a fixed-wing aircraft and a lighter-than-air aircraft. A rotary-wing aircraft includes a helicopter or compound aircraft of any configuration, including without limitation a single rotor, tandem rotor, coaxial rotor, intermeshing rotor, quad rotor, ducted fan, wing-compound aircraft and thrust-compound aircraft. The term 'aircraft' also includes any vehicle capable of flight due to aerodynamic lift in which motive power for flight is on board the aircraft.

The motive power for a prior art aircraft is not interchangeable for an alternative power source using a different technology. The motive power for the prior art aircraft is not changeable without also at least partially dismantling the aircraft. The prior art does not teach the power module apparatus, system, or method of the invention and does not teach the mounting system or the ground handling system of the invention for the power modules.

II. SUMMARY OF THE INVENTION

The power module system of the Invention comprises an aircraft and a plurality of power modules that may be selectably attached to the aircraft and provide power to the aircraft drive system. The aircraft may be a rotary-wing aircraft, a fixed-wing aircraft, a lighter-than-air aircraft or any other aircraft. The aircraft drive system is configured to propel the aircraft through the air or to power the aerodynamic flight of the aircraft. The aircraft drive system may be separate from the power module and may be configured to accept electrical power from the power module, to accept mechanical power from the power module, or to accept both electrical and mechanical power from the power module.

The power modules are interchangeable, as described below, and at least one of the plurality of power modules of the power module system includes a power production apparatus that provides power to the aircraft drive system using a technology that is different from the technology used by another power production apparatus contained within another of the plurality of power modules of the same power module system. As used herein, the term 'technology' means the mechanism by which a power module generates or stores power and the mechanism by which the power module transfers the power to the aircraft drive system.

The fuselage of the aircraft may define openings configured to receive any of the plurality of power modules. The power modules may be configure to be attached to the aircraft in pairs, with a starboard power module disposed on the starboard side of the aircraft and a port power module disposed on the port side of the aircraft. The power modules may be specific to the port or starboard sides, or may be interchangeable between the port and starboard sides. Alternatively, the power module system may utilize a single power module or more than two power modules to provide power to the aircraft drive system rather than a pair of power modules. All references in this document to a pair of power modules apply equally to single power module or to more than two power modules and all references to a single power module or to more than two power modules apply equally to a pair of power modules.

Where the power modules are configured for attachment to the aircraft in pairs, the power module system includes at least two pairs of power modules, where one pair of power modules either generates or stores power using a power production apparatus that uses a technology different from the power production apparatus of another of the pairs of power modules. For example, the power production apparatus of one pair of the power modules may be a turbine engine turning a generator, while the power production apparatus of another pair of power modules of the same system may store electrical power chemically in a battery. Each of the pairs of power modules may have a different suite of capabilities and characteristics. The alternative power modules and pairs of power modules are independently selectable by a user and the user may select among the alternative power modules and pairs of power modules to select the technology to power the aircraft and to match the capabilities and characteristics of the selected power module(s) to the application or to a particular mission of the aircraft.

Where the aircraft drive system is electrically powered, the aircraft drive system includes one or more electrical motors. Each power module or pair of power modules provides electrical power to the one or more electrical motors and may utilize any technology to generate or to store electrical power. For example, the pair of power modules may store electrical power in a chemical battery or may define capacitors that store electrical energy between charged plates. The power modules may generate electrical power, as by a fuel cell that electrochemically converts chemical energy of a fuel such as hydrogen and an oxidizing agent, such as oxygen, into electricity. The power modules may include a prime mover that combusts fuel to turn a generator that generates electrical power. The prime mover may be a gas turbine engine that generates rotary power within the pair of power modules and that turns an electrical generator within the power modules. Rather than a turbine engine, the prime mover to turn the electrical generator may be a diesel or gasoline-fueled internal combustion engine. As used in this document, each of a fuel cell, a turbine engine connected to a generator, a diesel engine connected to a generator, and a gasoline powered engine connected to a generator generates electrical power using a different technology. A battery stores electrical power using a technology different from a capacitor. A battery or capacitor uses a different technology to provide electrical power than a fuel cell or a prime mover attached to a generator. A battery using one battery chemistry, for example a lithium-ion battery chemistry, does not use a different technology from a battery using another battery chemistry, such as lead-acid battery chemistry.

For an aircraft powered by an electric motor housed within the fuselage, the power module(s) may provide DC power to two or more inverters. The inverters convert the DC power to AC power for use by the AC motor(s). By controlling the AC frequency of the inverter output, the aircraft control system can control the speed of rotation of the aircraft rotors, propellers or ducted fans. Large inverters are costly and failure of the inverter in a one-inverter system would result in a complete loss of the power required to keep a rotary-wing or fixed-wing aircraft airborne. To reduce cost and to provide redundancy for safety, the aircraft may include multiple relatively small inverters. For a power supply system for an aircraft with four inverters, the failure of any one inverter results in a 25% loss of power. For a power supply system for an aircraft that includes eight inverters, the failure of any one inverter results in a 12.5% loss of power. For a manned aircraft, multiple relatively small power inverters may be constructed from readily available components, reducing cost and reducing the effect of failure of any one inverter. Also, the use of multiple small inverters does not result in a weight or space penalty within the aircraft. The use of multiple small inverters is not limited to aircraft using interchangeable power modules and applies to any electrically-powered aircraft.

A mechanically powered aircraft drive system may receive mechanical power from a power module by way of a rotating input shaft attached to the aircraft. The pair of power modules may include a rotating output shaft that mates with the rotating input shaft when the pair of power modules is attached to the aircraft. For a mechanically powered aircraft drive system, the power module system includes two or more of the pairs of power modules that are interchangeable and independently selectable by the user, where at least one of the power module pairs provides mechanical rotary power to the output shaft using a technology different from another of the power module pairs. By selecting among the power module pairs, the user may select the technology that will power the aircraft drive system.

The power module may rotate an output shaft by a prime mover comprising a turbine engine, a diesel internal combustion engine, a gasoline-powered internal combustion engine, or an electric motor where the alternative source of mechanical power is housed within the power module. Rather than generating mechanical power, the power module may store mechanical power configured to rotate the output shaft in the form of compressed gas in a compressed gas engine, as a compressed or wound spring, or as a rotating mass in a momentum engine. When the power module is attached to the aircraft, the output shaft of the power module engages the input shaft of the aircraft drive system, and, for a helicopter, selectably turns the rotor. For a mechanically-powered drive system, each of a turbine engine, a diesel engine, a gasoline powered internal combustion engine, an electric motor, a compressed gas engine, a compressed or wound spring and a momentum engine generates or stores mechanical power using a different technology.

Where the power module is one of a pair of power modules, each of the power modules in the pair may serve a different function. For example, one of the pair of power modules may contain a prime mover and the other power module may include a fuel source for the prime mover. In the case were the prime mover is an electric motor located in one of a pair of power modules, the second power module may include a battery or other source of electricity, as described above for electrically-powered drive systems.

Each power module may be installed or removed from the outside of the fuselage of the aircraft without removing portions of the fuselage. When a power module is installed in the opening in the fuselage, the power module defines a portion of the aircraft skin exposed to the air outside the aircraft during flight.

In the method of the Invention, a user of an aircraft is provided with an aircraft and with a plurality of interchangeable power modules. At least one of the power modules is configured to provide power to the aircraft using a technology that is different from another of the plurality of power modules. The user selects one or more power modules to match the capabilities and characteristics of the power module to the needs of an application or the needs of a mission, or based on the availability of fuel or facilities. For example, where an application or a mission calls for extended range or quick turnaround, the user may select the power module having a turbine engine and generator, coupled with a second power module that contains a fuel tank for the turbine engine. For an application or a mission that requires reduced noise, the user may select the power module defining a chemical battery. Where hydrogen fuel is available and air pollution is a concern, the user may select a power module that includes a fuel cell. Where diesel fuel or gasoline is available but jet fuel is not, the user may select a power module that turns the generator with a diesel or gasoline internal combustion engine.

In the method of the Invention, the user attaches the selected one or more power modules to the fuselage of the aircraft. The control system of the aircraft detects the selected one or more power modules and adjusts the cockpit or other displays of the aircraft to the information available and control requirements of the power module. For an aircraft having a human pilot on board the aircraft, the cockpit display communicates information appropriate to the installed power module. For example, for a pair of power modules having a turbine engine coupled to an electrical generator and a fuel tank, the cockpit display may show the fuel level, exhaust gas temperature, oil temperature and level, and throttle position. For a pair of power modules defining a battery, the cockpit display may show the state of charge and internal temperature of the cells of the battery. If the user installs a different power module using a different technology, the cockpit display and controls available to the pilot may change automatically to reflect parameters appropriate to the technology of the new power module.

The fuselage of the aircraft and the power modules define structures to support the relatively heavy, relatively stiff power modules on the relatively light, relatively flexible fuselage. Where the aircraft will receive a pair of power modules comprising a port and a starboard power module, the fuselage may define three structures to support the weight of the power modules. The first structure is a central keel running along the centerline of the aircraft at the bottom of the fuselage. The central keel resists flexure of the fuselage in the vertical direction. The central keel defines keel connection points for connection of the pair of power modules to the fuselage. Fore and aft keel connection points provide two locations at which a power module may be attached to the keel. The fore and aft keel connection points are located proximal to the fore and aft ends of the keel.

The other two fuselage structures to support the power modules are a port structural beam and a starboard structural beam disposed above the opening of the fuselage that receives the power modules and along the outside surface of the fuselage. The port and starboard structural beams extend parallel to the longitudinal axis of the aircraft. Each of the port and starboard structural beams defines a fore and an aft beam connection point to allow the port and starboard power modules to be connected to the port or starboard beams at two locations, for a total of four connection points for each power module. Each power module defines power module connectors that correspond to the keel connection points and the structural beam connection points.

The power module connectors and each of the keel connection points and structural beam connection points may define openings that align and that are selectably penetrated by mounting latches. The mounting latches may be operated by a lever so that a human user may actuate the lever when the power module connectors, the structural beam connection points and the keel connection points are in alignment. The lever will cause the mounting latches to penetrate the corresponding openings, attaching the power module to the fuselage at each of the connection points. When a user throws the lever, a system of rods and bell cranks moves the mounting latches simultaneously. The mounting latches or the openings or both may be tapered to accommodate misalignment of the mounting latches and openings.

The port and starboard structural beam connection points may be equipped with axially free bushings, for example spherical or prolate bushings, to allow relative motion of the power modules and the structural beams in the axial direction of the axially free bushings parallel to the longitudinal axis of the aircraft and to allow angular motion of the port and starboard structural beams with respect to the power module structure. The net effect is to reduce the effects of relative motion of the fuselage and power module, to avoid the transfer of torsional and axial/lateral forces from the fuselage to the power modules, and to avoid excess structural weight. The power modules thus may be constructed to be lighter than would otherwise be the case.

The mounting of a stiff, heavy power module to a light, flexible fuselage presents issues for the transmission of data and electrical power across the power module/fuselage interface because of vibration and relative motion between the power module and the fuselage. The locations at which the relative motion is the least is at the keel connection points and structural beam connection points. To prevent arcing and momentary interruption of the electrical power connections, the electrical connectors are located as close as possible to the structural beam connection points or as close as possible to the keel connection points. The high-voltage electrical power connectors also may be located away from the skin of the aircraft and internal to the fuselage to prevent the risk of inadvertent contact between a user and the high-voltage electrical power connectors.

Also to avoid arcing and momentary power interruptions, the electrical power connectors are configured to be structurally compliant at the interface while offering a contact force and area that is highly reliable. The power module and fuselage electrical power connectors may move compliantly with respect to each other, due either to the resilience of an elastomer or of a spring.

The lever that mechanically locks the power module to the fuselage also may simultaneously connect the electrical power connectors of the power module to the aircraft drive system. Alternatively, the electrical power connectors may connect automatically when the power module is placed in position with respect to the fuselage and before the lever is thrown.

The aircraft control system will communicate with and monitor the power module through a data connection. The data connection between the power module and fuselage also is located near the beam connection points or keel connection points to reduce the effect of vibration and relative motion. The data connection may be a digital optical connection through optical couplers. The digital optical connection avoids any risk of arcing and reduces the likelihood of a control or monitoring signal interruption due to vibration or relative motion between the power module and the fuselage.

The aircraft control system detects the identity and the status of the power module through the data connection. The aircraft control system also determines all relevant information about the power module, such as the mass and mass distribution of the power module. The aircraft control system either determines that information based on communications from the power module over the data connection or directly from sensors on the aircraft. The aircraft control system is programmed to adjust the control laws governing the flight of the aircraft to conform to the characteristics of the power module, such as its mass and mass distribution. The aircraft control system also will adjust control effectors, control actuators, and displays to conform to the installed power module. For example, for a storage battery power module, the control system may adjust a pilot display to show the state of charge of the battery and may adjust an effector and actuator to control voltage delivered to a motor, while for a turbine engine mechanical drive system the control system may adjust the pilot display to show the liquid fuel level and may adjust the effector and actuator to control the turbine engine throttle.

In one design for a pair of power modules to be used on a compound helicopter, each of the power modules has a design weight of 1600 lbs. The system of the Invention may include a ground handling system to lift the power modules into engagement with the fuselage of the aircraft, to lower the power modules out of engagement with the fuselage, and to move a power module about on the ground when the power module is disengaged from the aircraft. The power module defines power module lift points. The ground handling system defines supports that correspond to and are proximal to the power module lift points. When the ground handling system engages the power module to lift the power module to the fuselage, to lower the power module from the fuselage, or to move the power module about on the ground, each of the ground handling system supports engages one of the power module lift points. Each of the power module lift points defines an opening, the size of which corresponds to a pin extending through each of the ground handling system supports. When the ground handling system engages the power module, each pin penetrates a corresponding opening. Because the pins will penetrate the openings in more than one direction, the power module is secured to the ground handling system supports in three dimensions. The power module lift points are located immediately adjacent to the connection points that connect the power module to the fuselage. Co-locating the connection and lift points allows the internal structure of the power module to be lighter than would otherwise be the case.

Aircraft require extensive government certifications to allow the aircraft to be sold and to carry paying passengers. Prior art government certification procedures involve certifying the aircraft as an integrated whole, including the power production systems on board the aircraft. The Invention separates the power production systems from the remainder of the aircraft and allows ready exchange of one power production system for another power production system, including power production apparatus that have not yet been developed and using technologies that have not yet been conceived. The modular nature of the Invention is particularly useful in a certification system that is also modular-in which modular power production systems may be certified separately for use in the already-certified aircraft.

III. BRIEF SUMMARY OF THE DRAWINGS

Figure 6A:
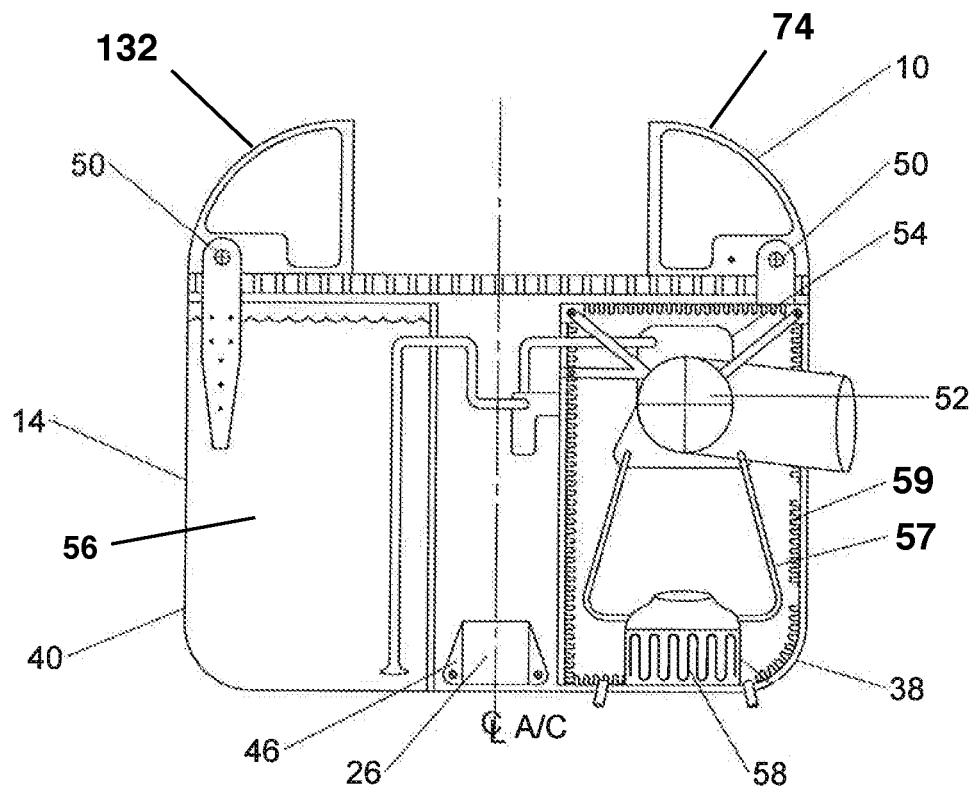
FIG. 6A is a section view through a pair of power modules having a turbine engine and generator FIG. 6Ba is a perspective view of port and starboard power modules having fuel cells.
Figure 6B:
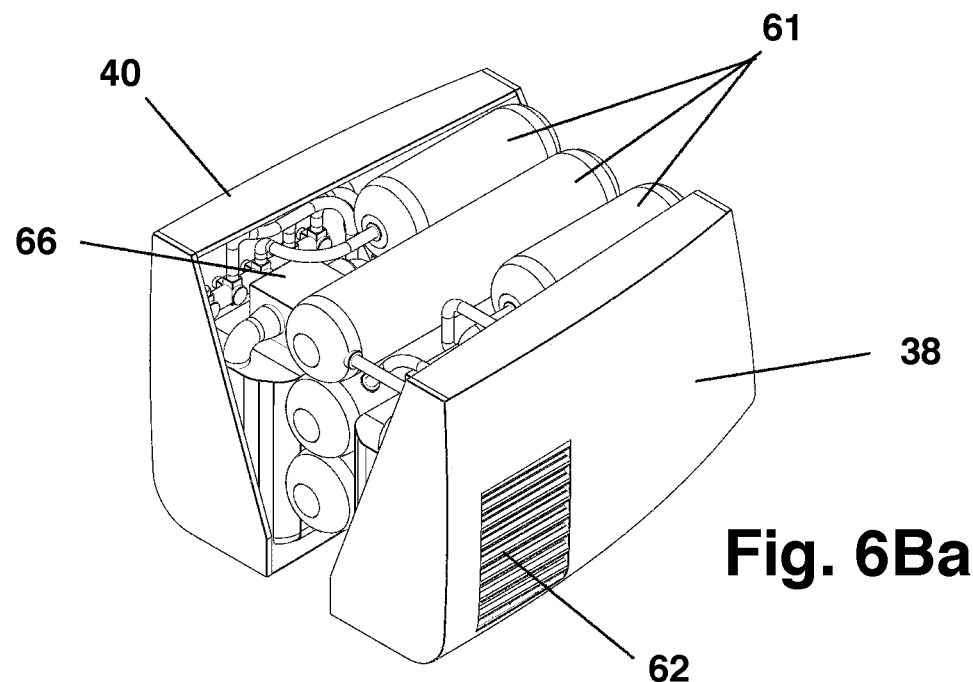
Figure 6B:
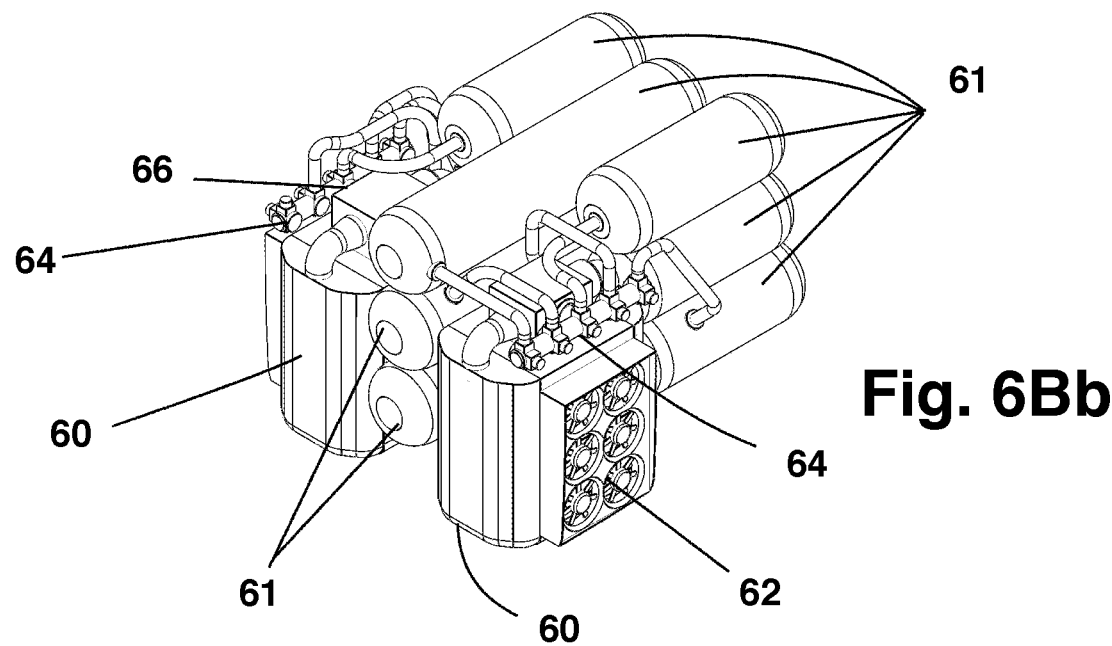

FIG. 6Bb is a cutaway perspective view of the port and starboard power module having fuel cells with the structure of the power module removed.

Figure 6C:
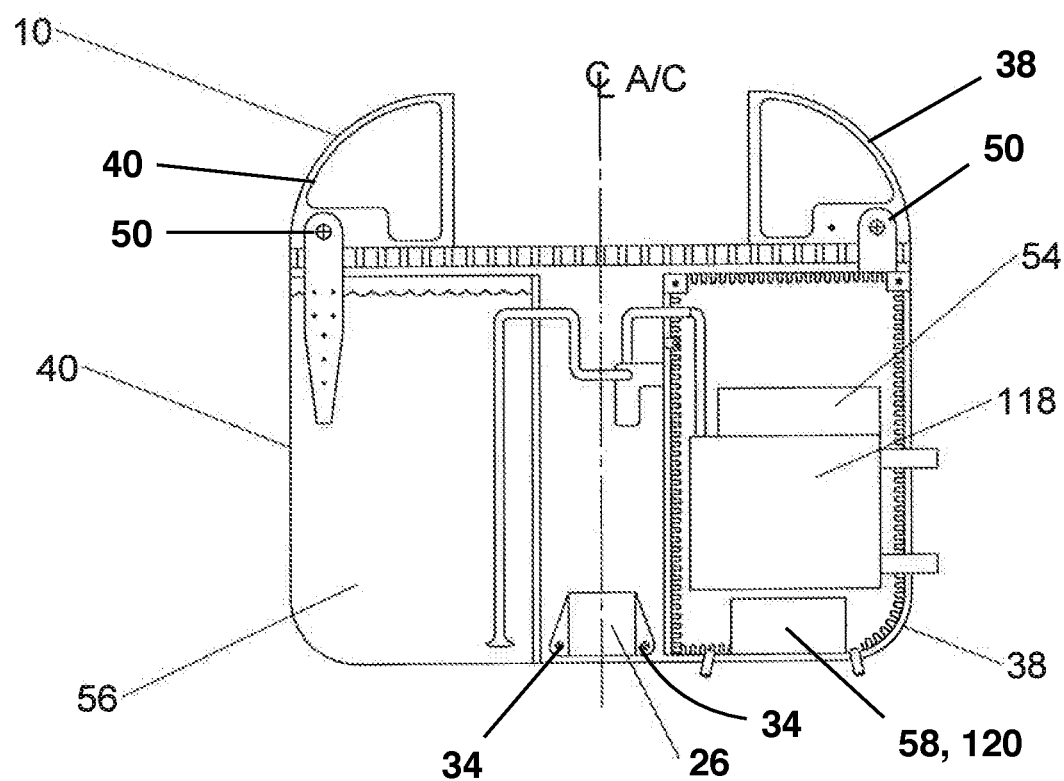

FIG. 6C is a section view of a pair of power modules having an internal combustion engine and a generator.

Figure 6D:
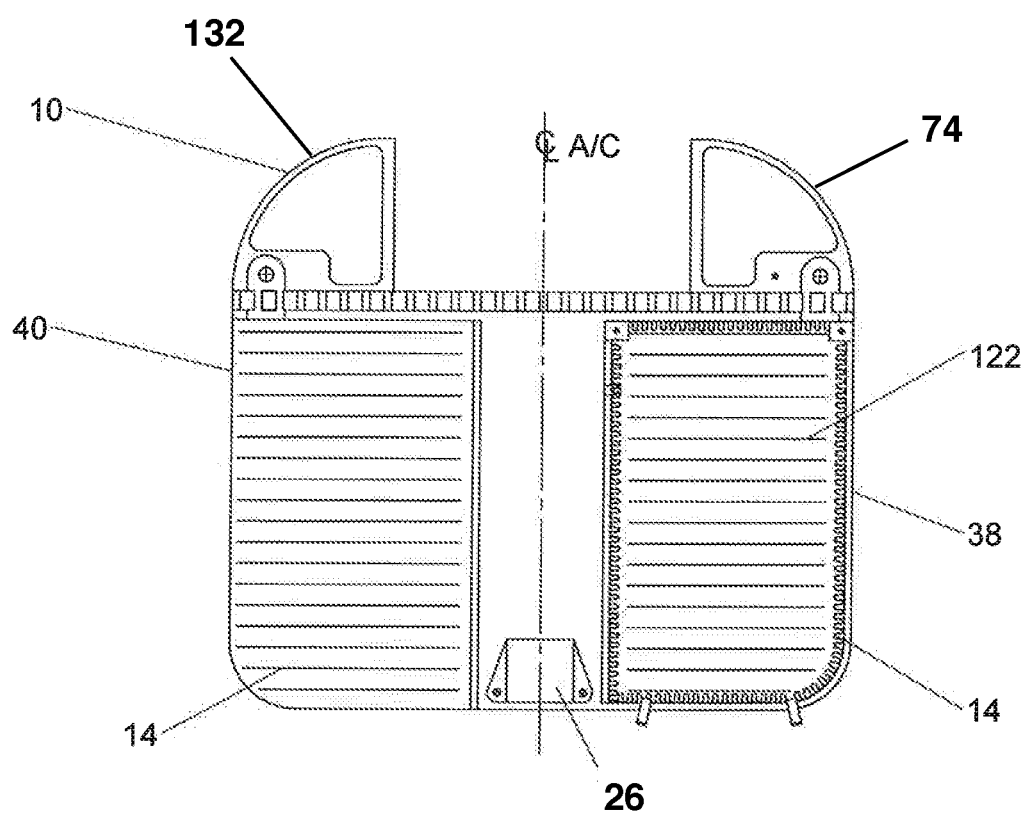

FIG. 6D is a section view of a pair of power modules having electrical storage batteries.

Figure 6E:
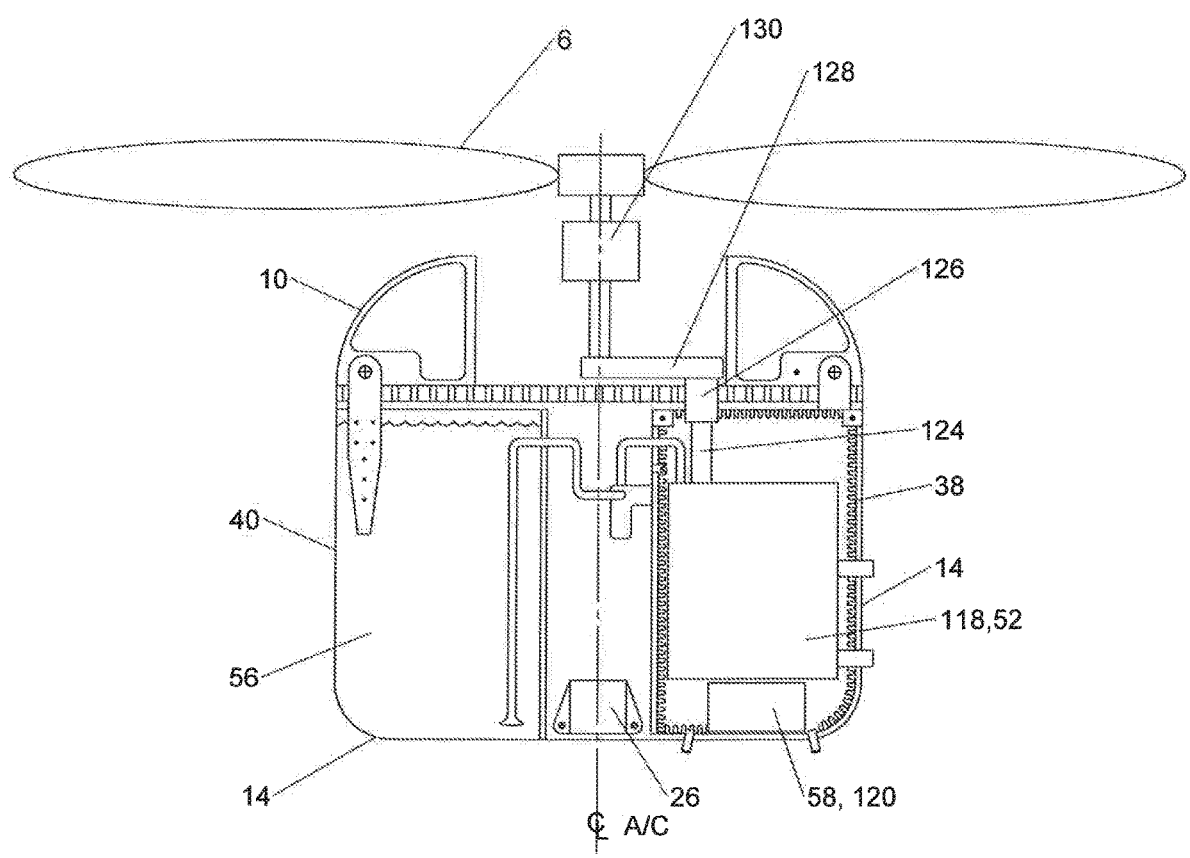

FIG. 6E is a section view of a pair of power modules having an internal combustion engine with a mechanical rotating output shaft.

Figure 6F:
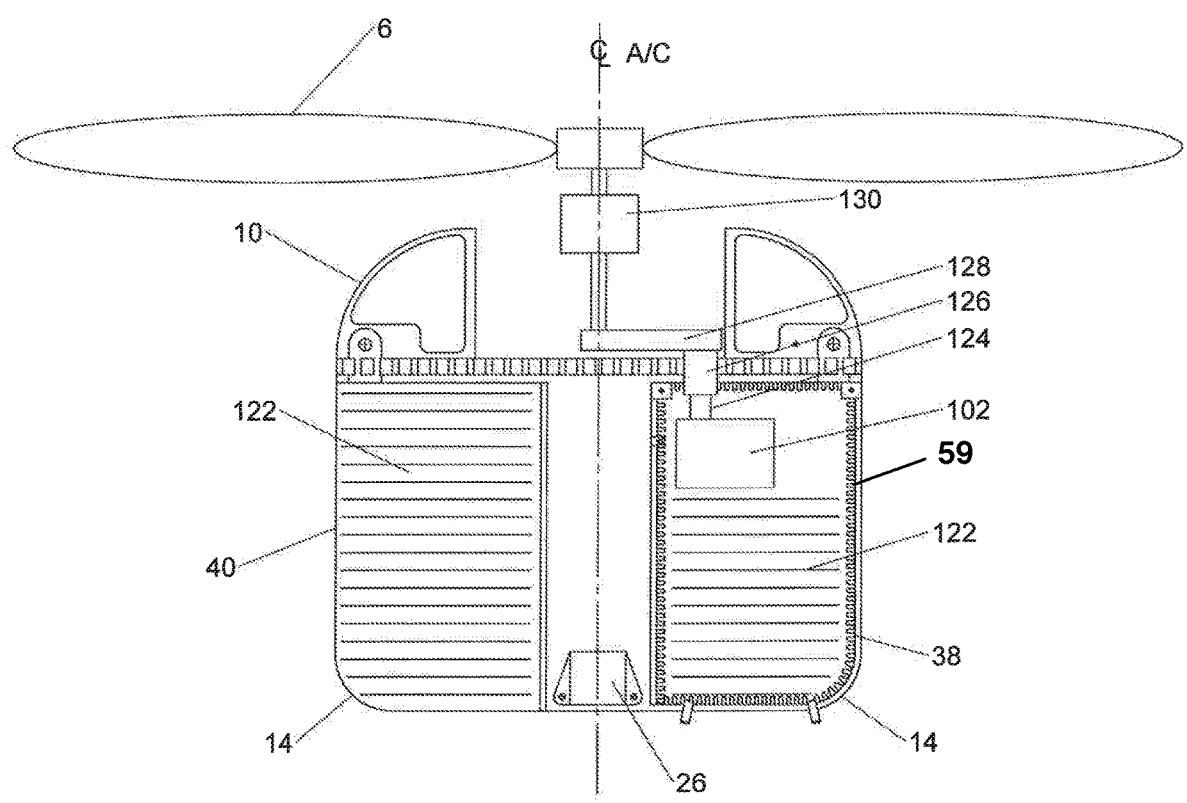

FIG. 6F is a section view of a pair of power modules having batteries powering an electric motor that drives a mechanical output shaft.

Figure 6G:
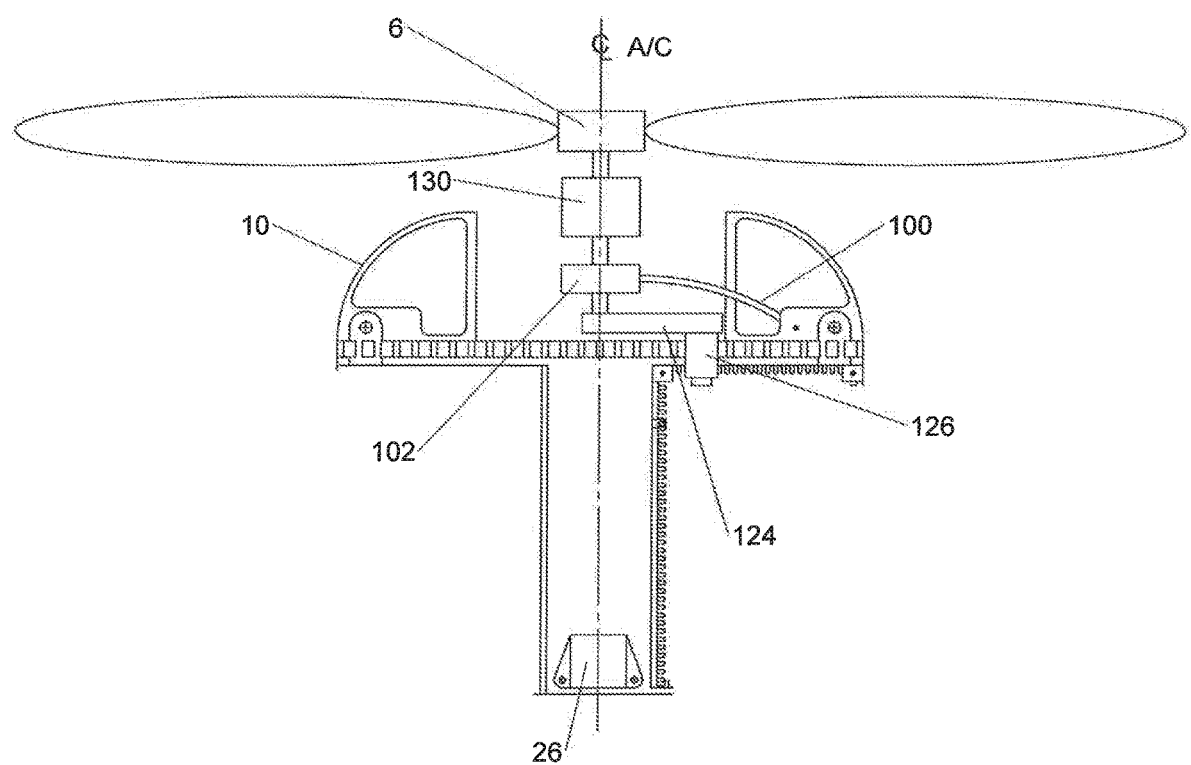

FIG. 6G is a section view of an aircraft with power modules removed, the aircraft accommodating power modules with either a mechanical output shaft or electrical output.

Figures 7, 8:
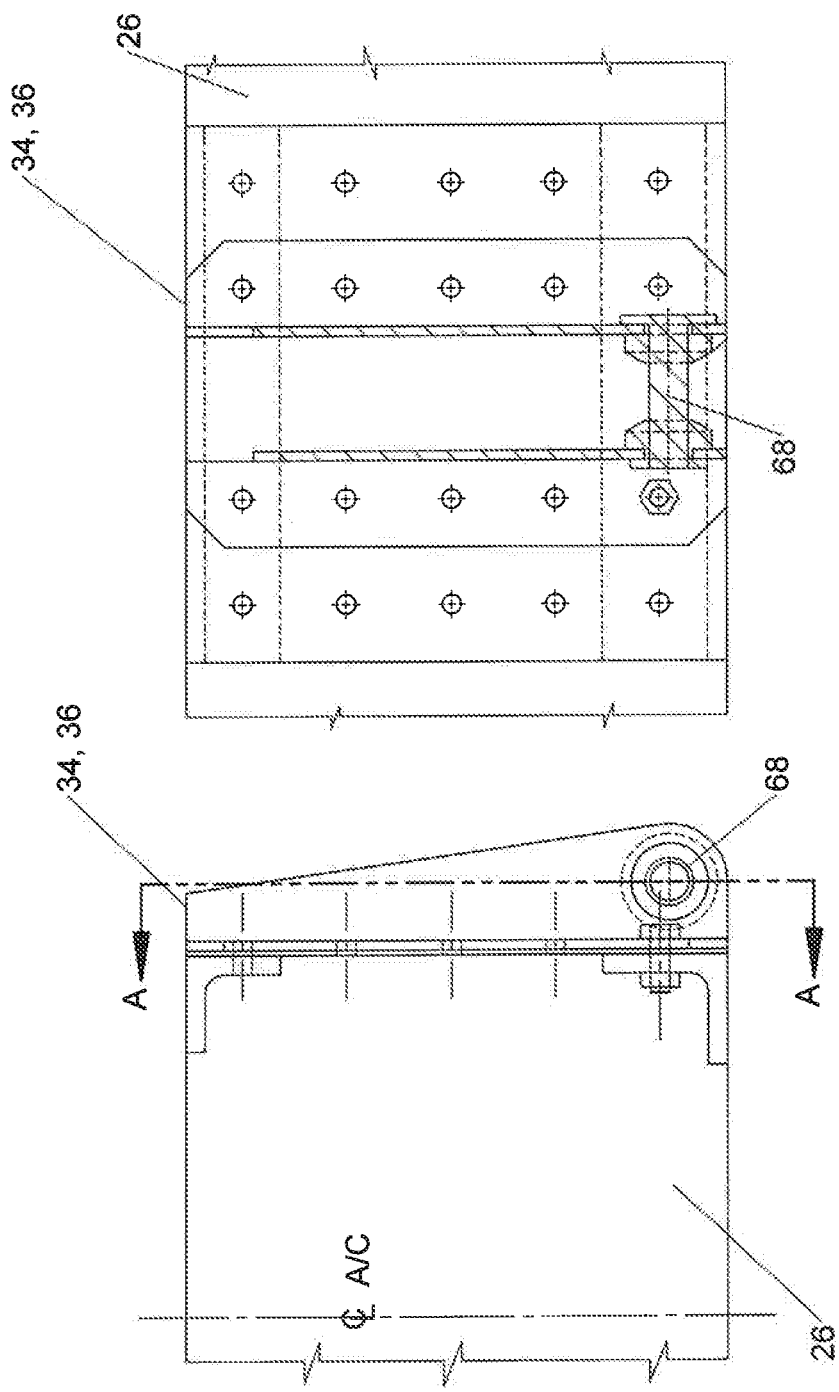

FIG. 7 is an end detail view of a keel connection point to engage a module keel connector.

FIG. 8 is a side view of the keel connection point of FIG. 7.

Figure 5:
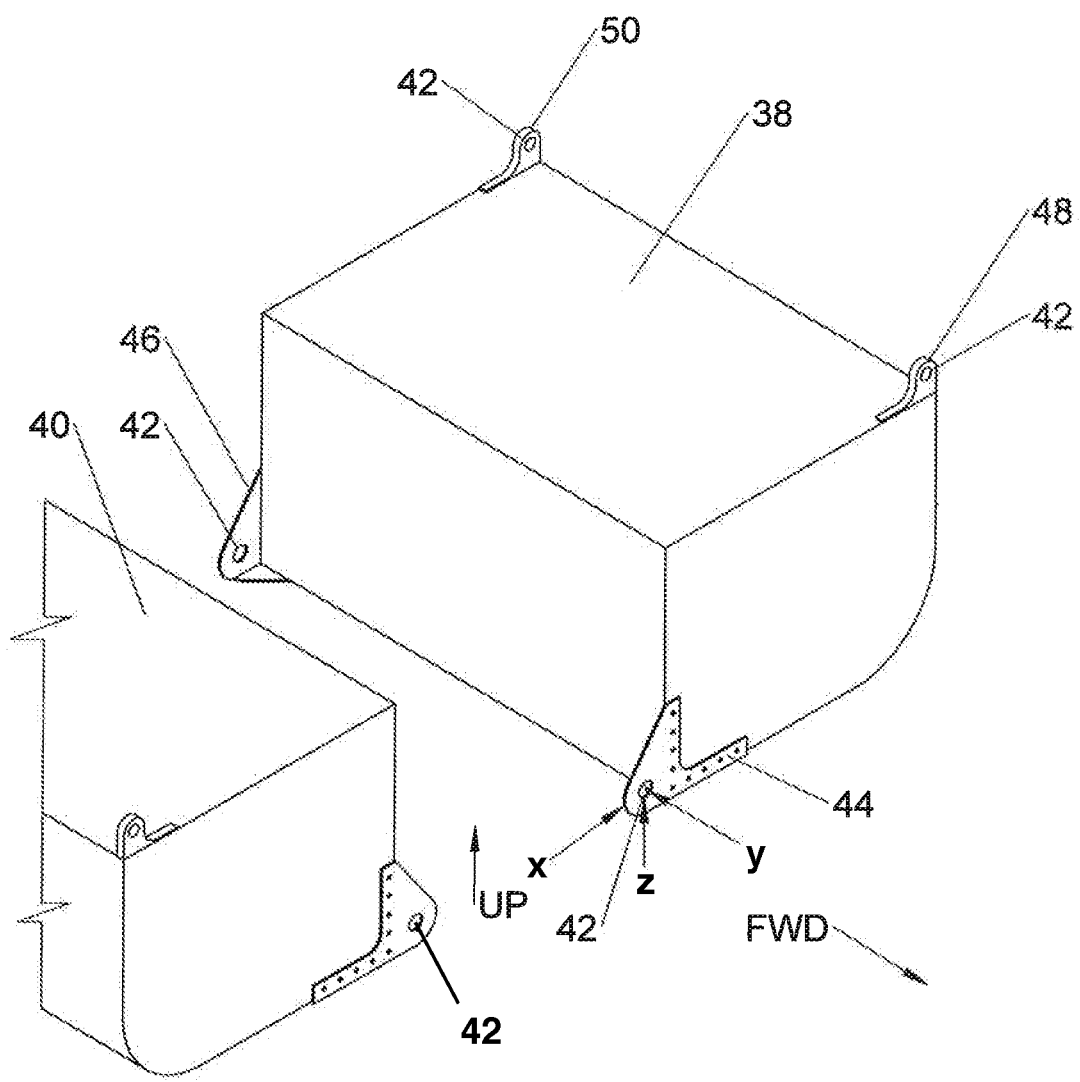
FIG. 5 is a perspective view of a pair of power modules.
Figure 9:
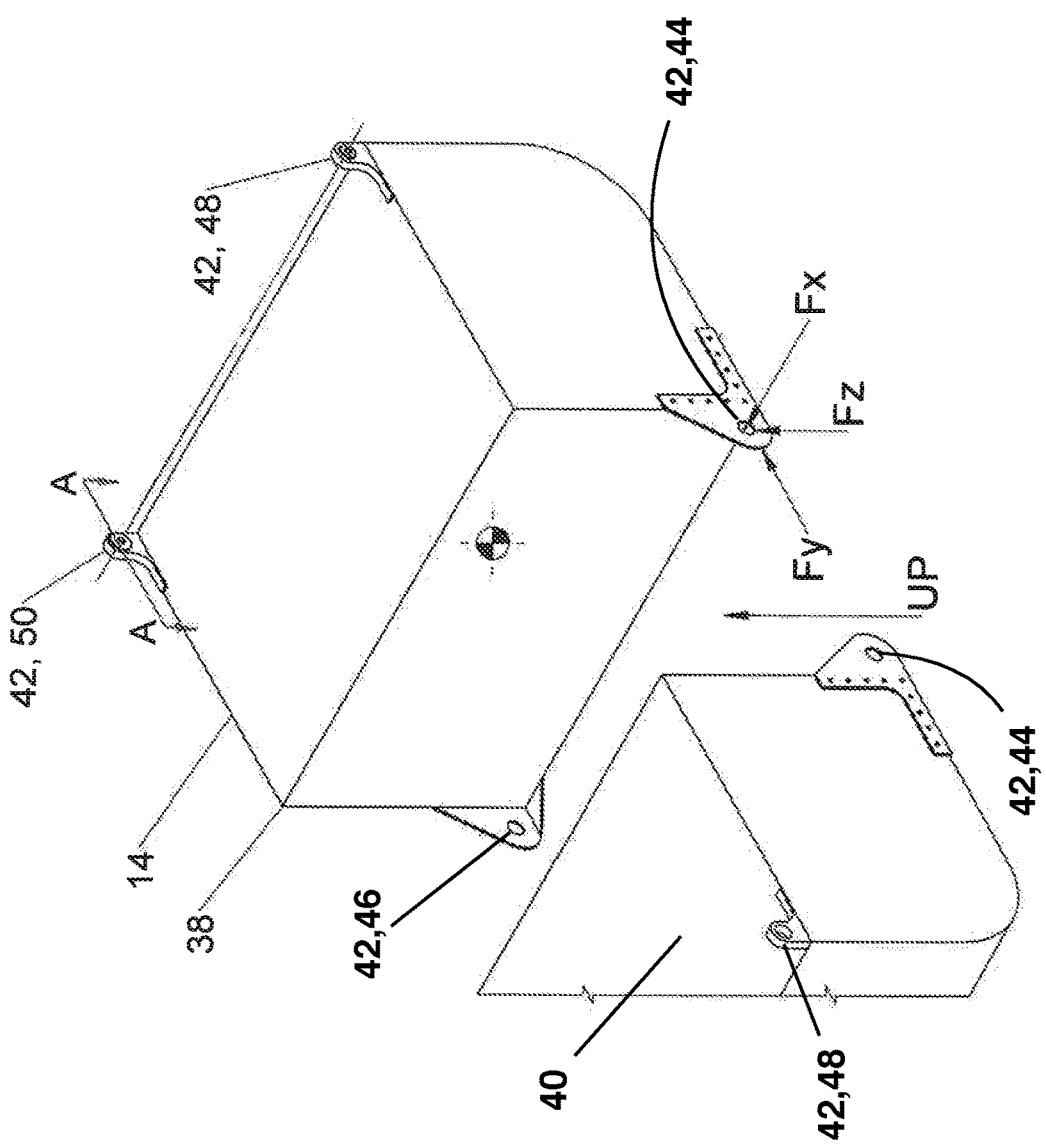

FIG. 9 is the perspective view of a pair of power modules of FIG. 5 marked to show forces acting on the power modules.

Figure 10:
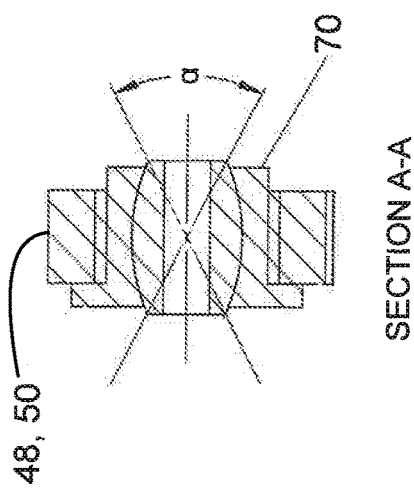

FIG. 10 is a section view through the forward or aft beam connector on the power module with an axially-free bushing.

Figures 11, 12:
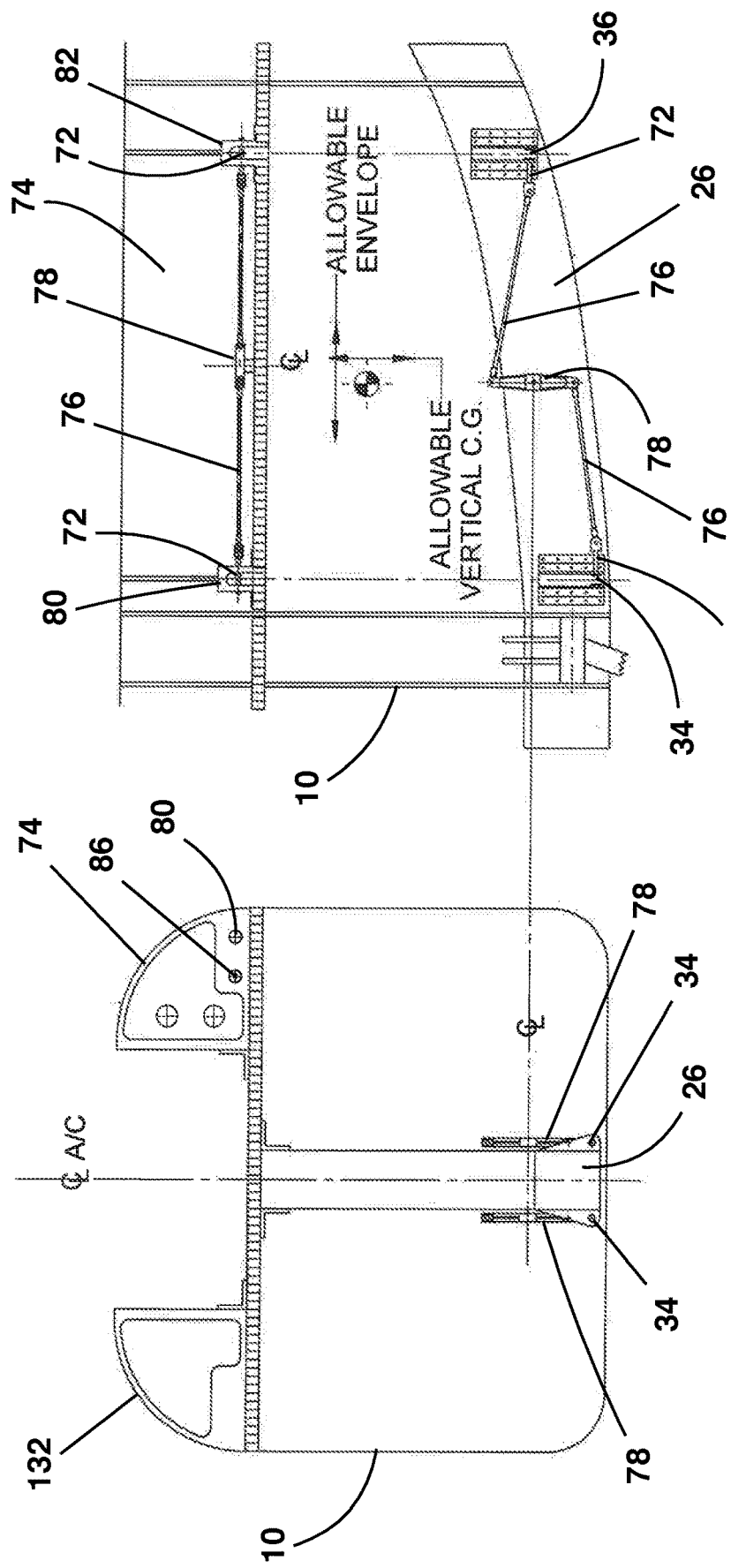

FIG. 11 is a detail of a section view of the fuselage looking aft through the keel and the port and starboard structural beams.

FIG. 12 is a schematic section side view of a power module showing the mounting latches of the power module and fuselage.

FIG. 13 is a cutaway view of the port or starboard structural beam showing details of the electrical connection and mechanical connection of the power module to the structural beam.

FIG. 14A is a detail cross section of the port or starboard structural beam showing the electrical and mechanical connection locations.

FIG. 14B is detail section view of the electrical connection between the power module and the fuselage.

FIG. 15 is a detail section view of an example mounting latch.

FIG. 16 is a detail section view of a forward or aft structural beam connection point showing an optical data connection between the power module and the aircraft control system and showing a section view of the axially-free bushing.

FIG. 17 is a side view of FIG. 16.

Figure 18:
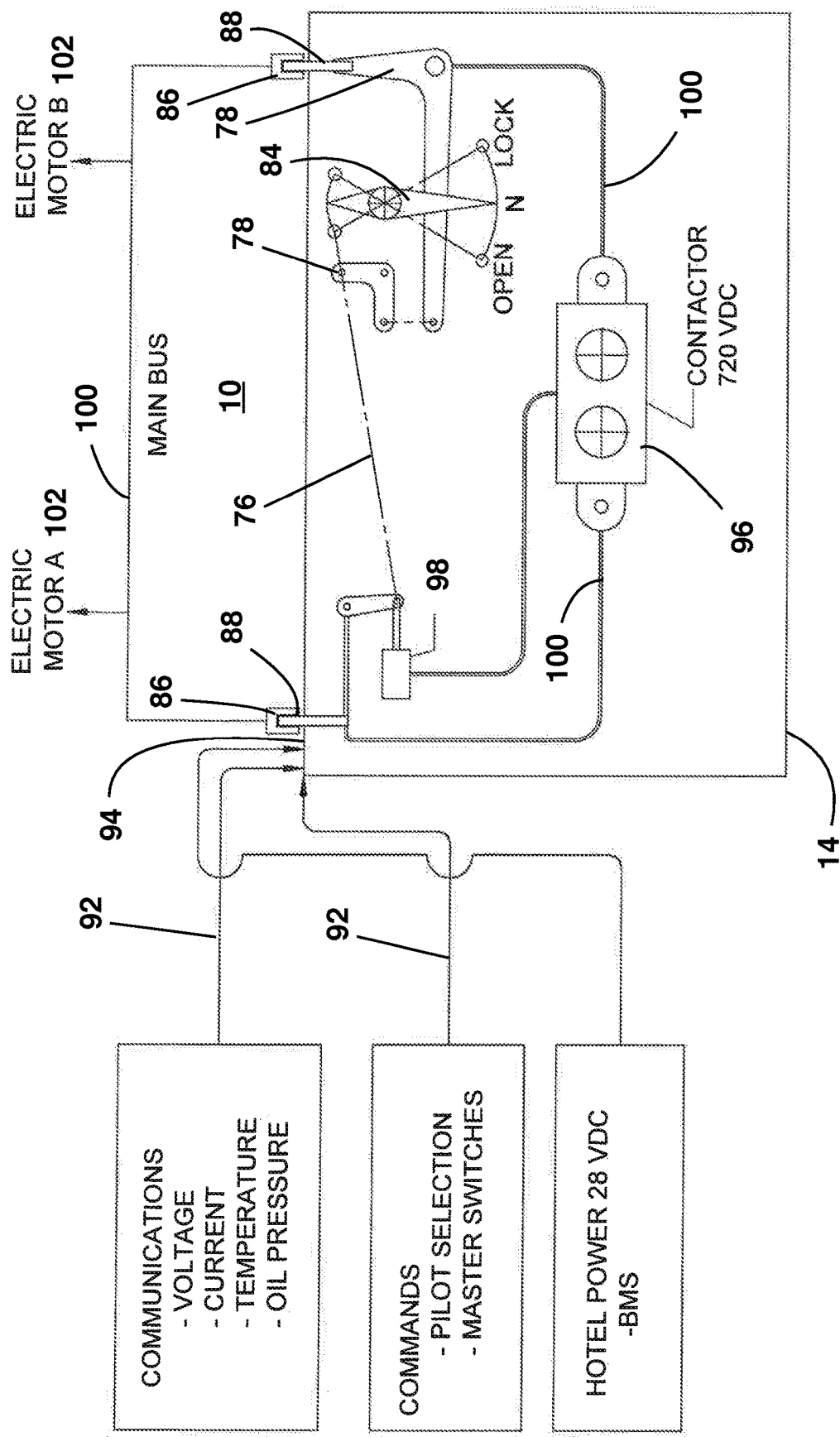

FIG. 18 is a schematic diagram of the mechanical lever controlling attachment of the power module to the fuselage and the control and electrical power connections.

Figure 19:
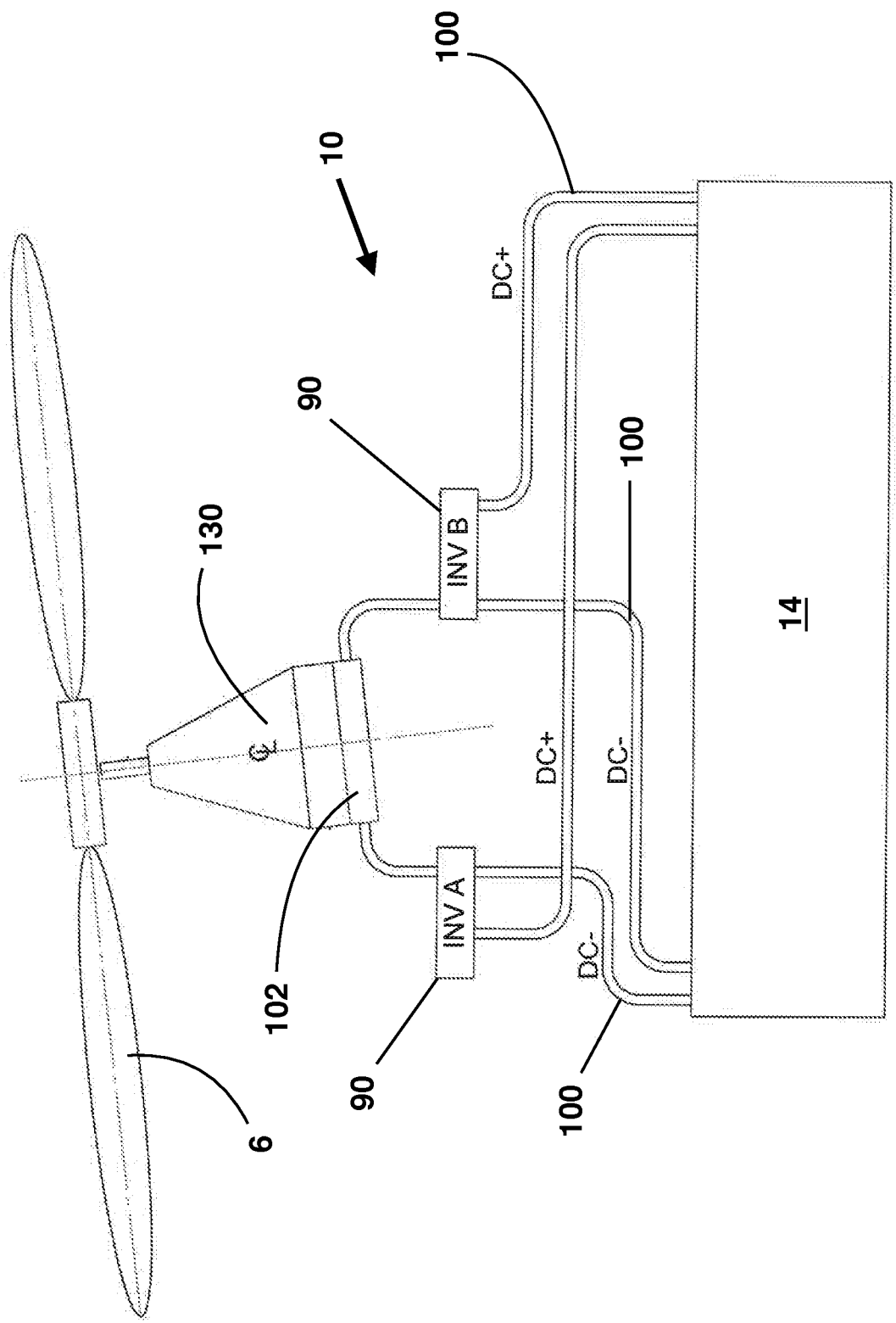

FIG. 19 is a schematic diagram showing a plurality of inverters.

Figure 20:
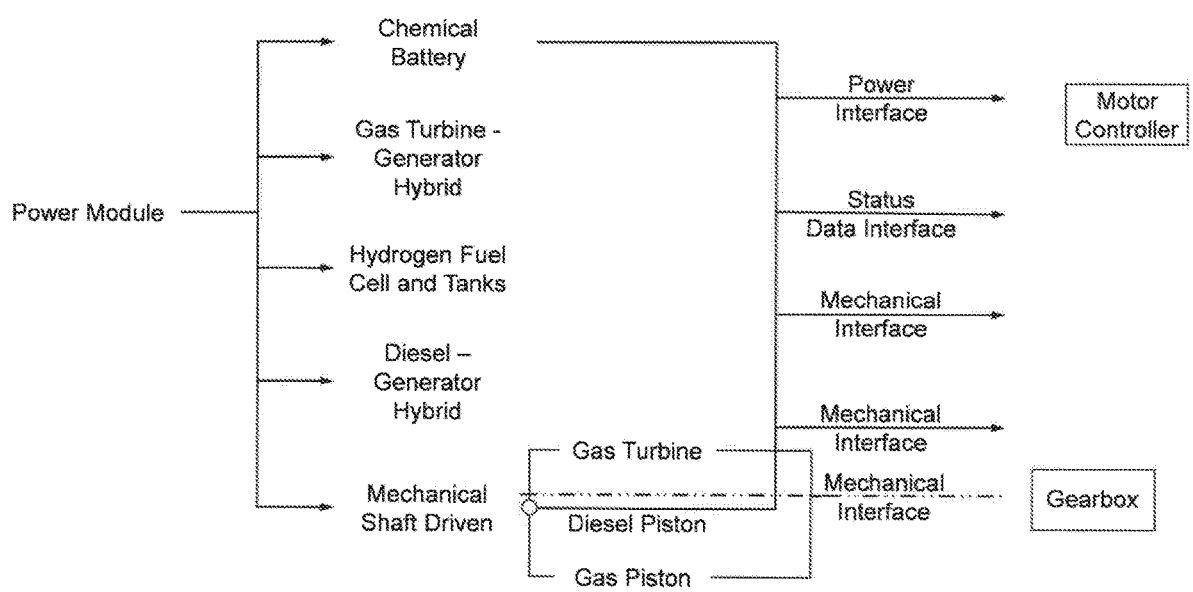

FIG. 20 is a schematic diagram of the modular power system design architecture.

Figure 21:
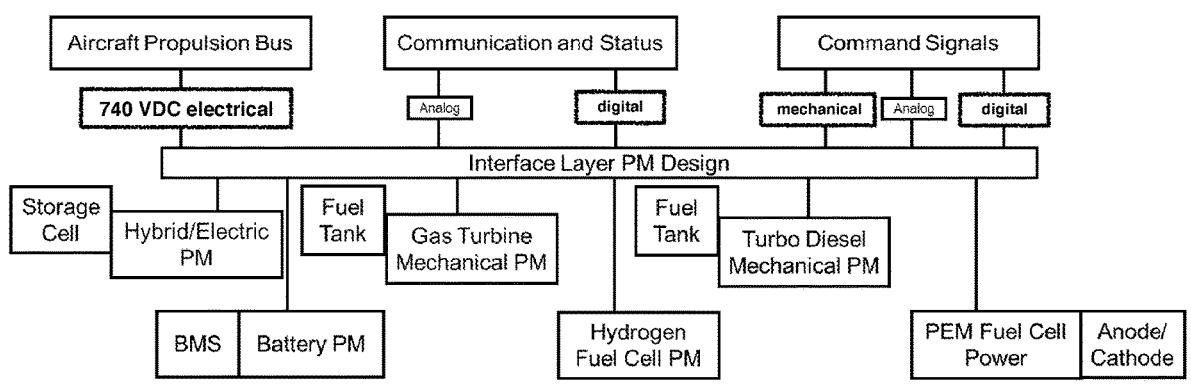

FIG. 21 is a schematic diagram of the architecture of the interfaces between the power module and the aircraft.

Figure 22:
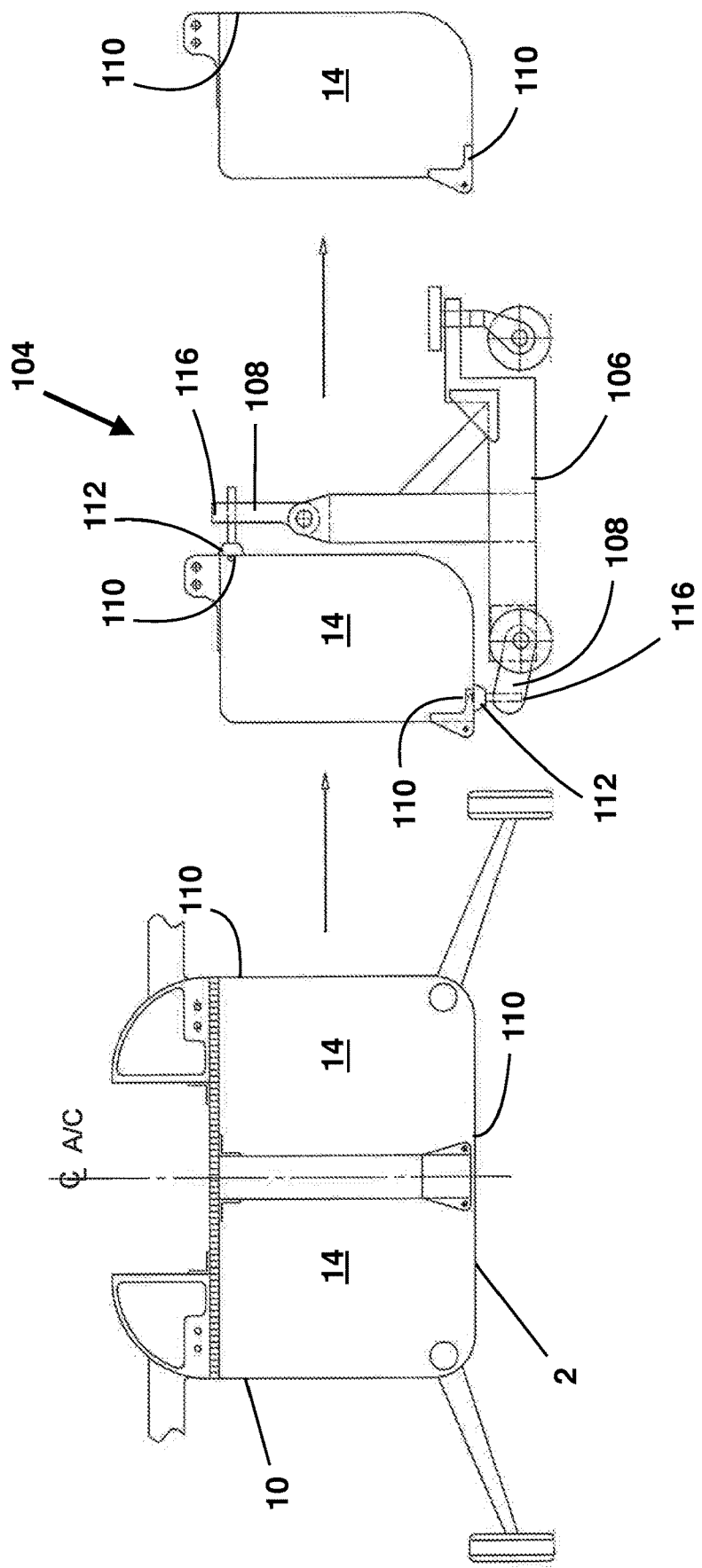

FIG. 22 is a schematic diagram showing the method of removing a power module from the fuselage using a ground handling system.

Figure 23:
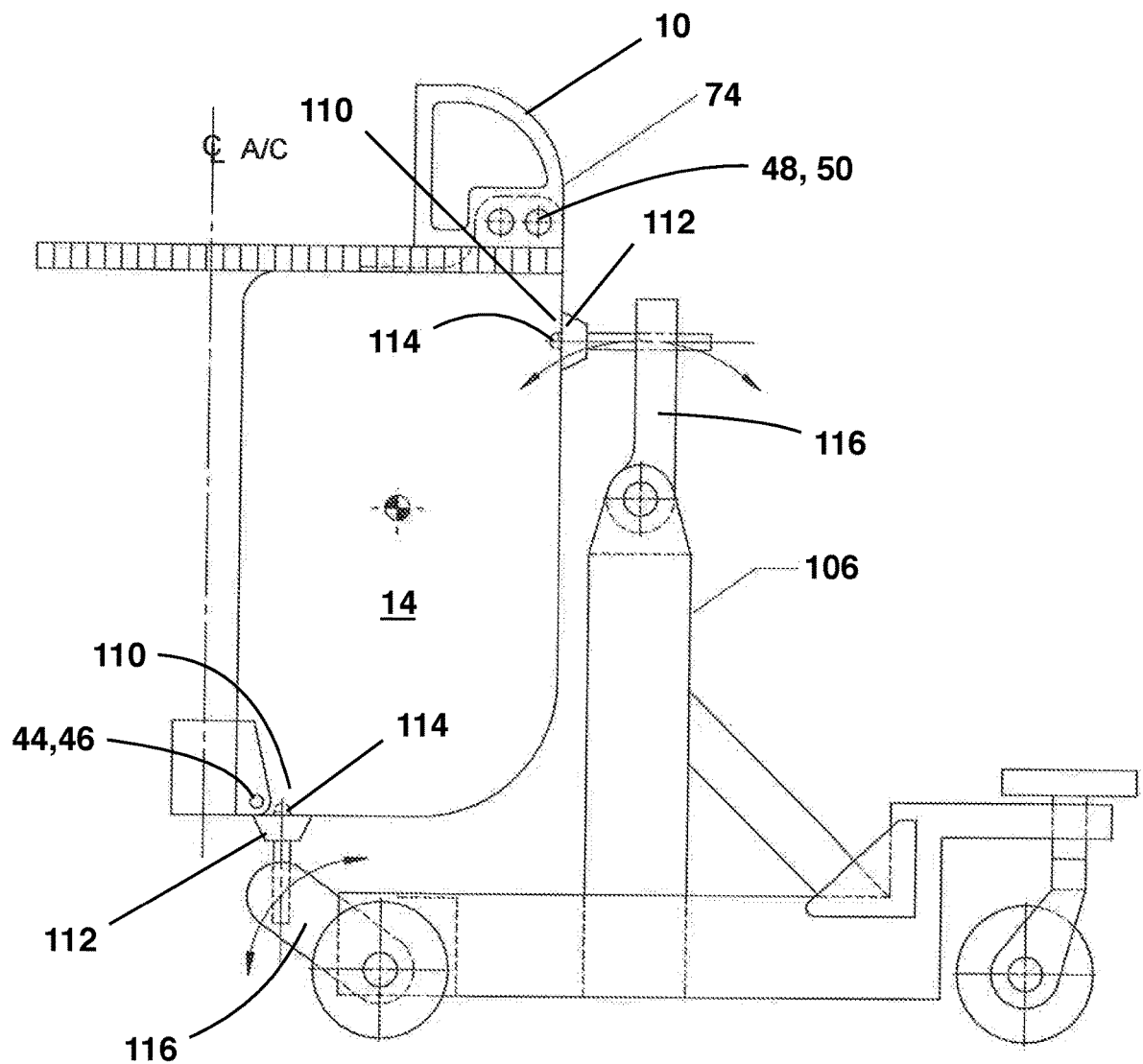

FIG. 23 is a schematic side view of the ground handling system, power module, and the fuselage.

FIG. 24 is a perspective view of the ground handling system holding a power module.

FIG. 25 is a detail view of ground handling system casters.

FIG. 26 is a detail side view of the ground handling system.

Figure 27:
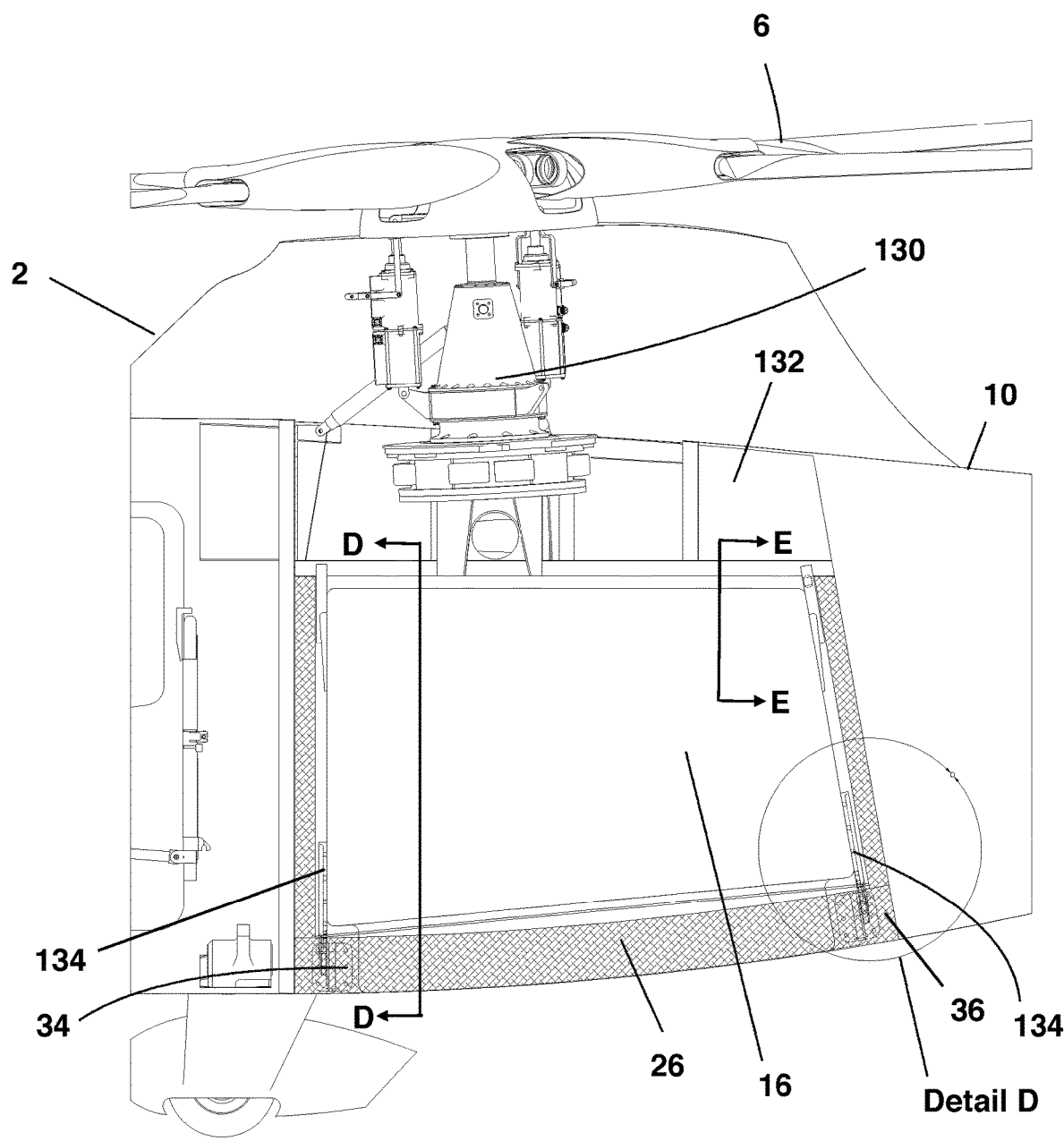

FIG. 27 is a side view of the aircraft and opening.

Figure 28:
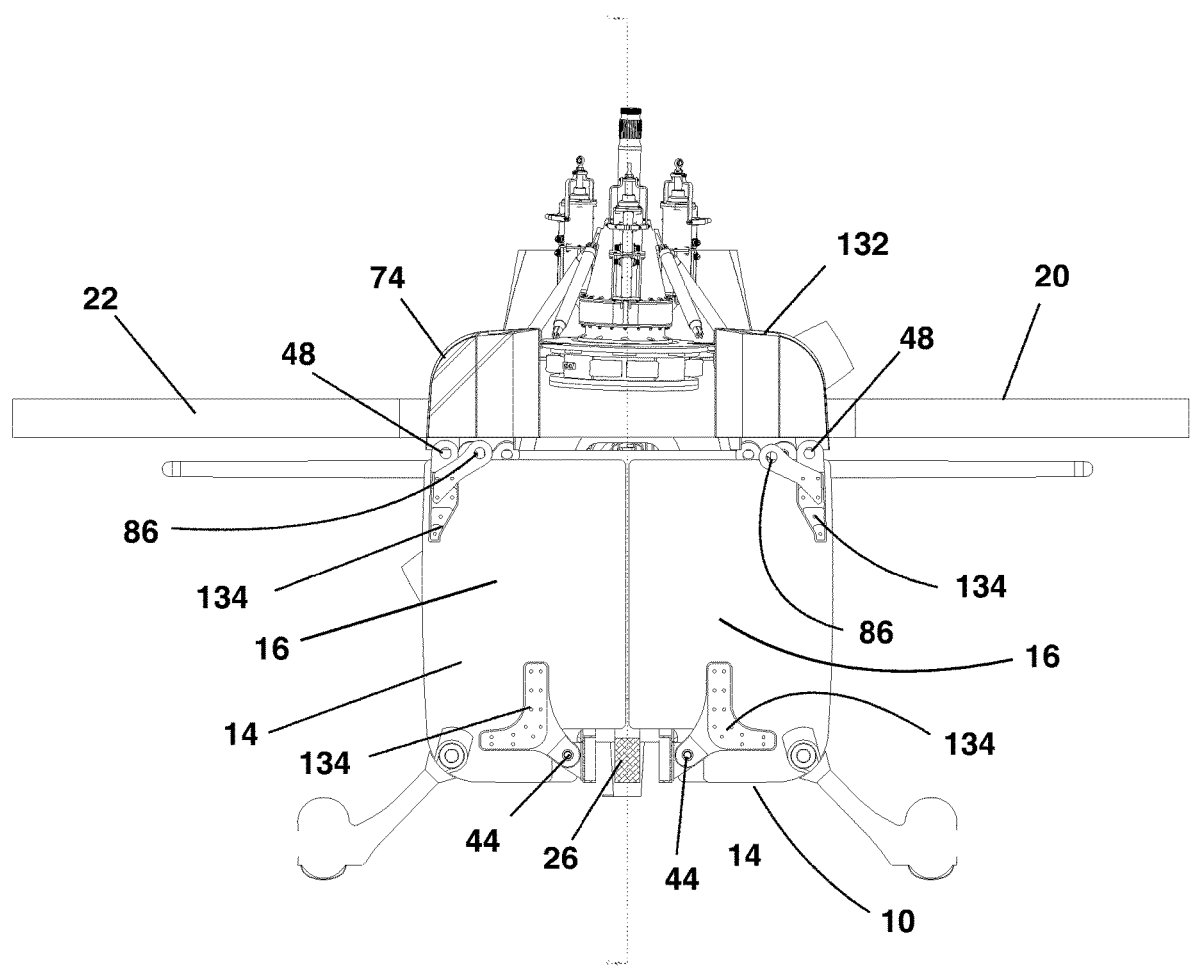

FIG. 28 is a section view of the fuselage showing the fuselage hard points and module supports.

Figure 29:
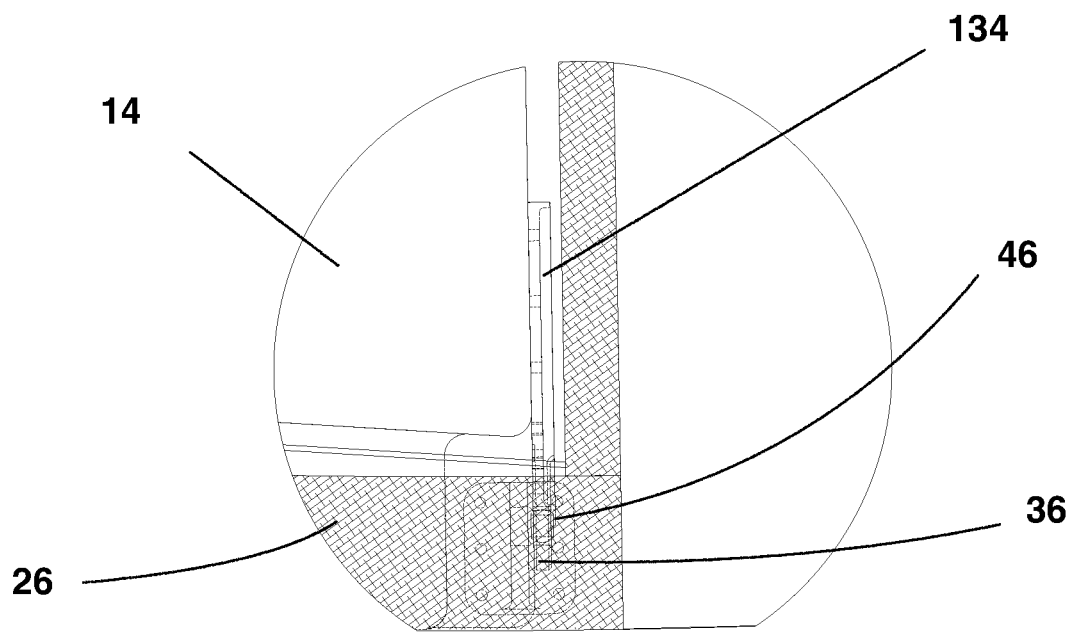

FIG. 29 is a detail view of a central keel connection point.

Figure 30:
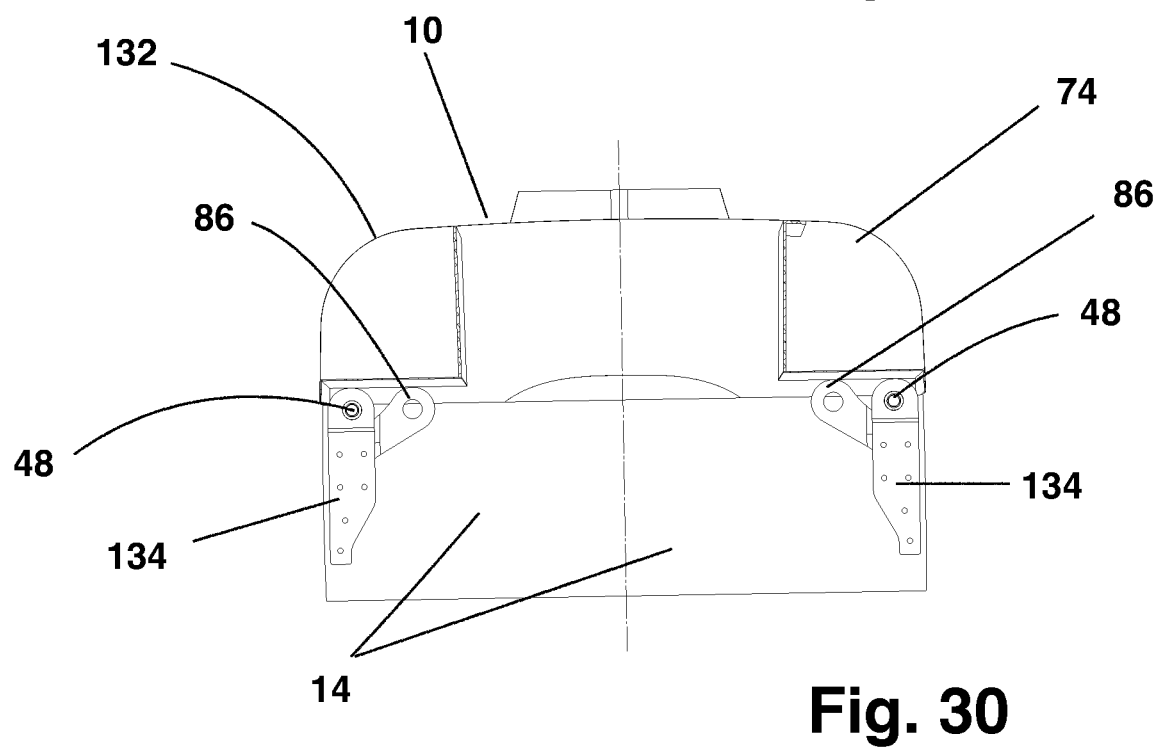

FIG. 30 is a detail view of the structural beams, hardpoints and power module supports.

Figure 31:
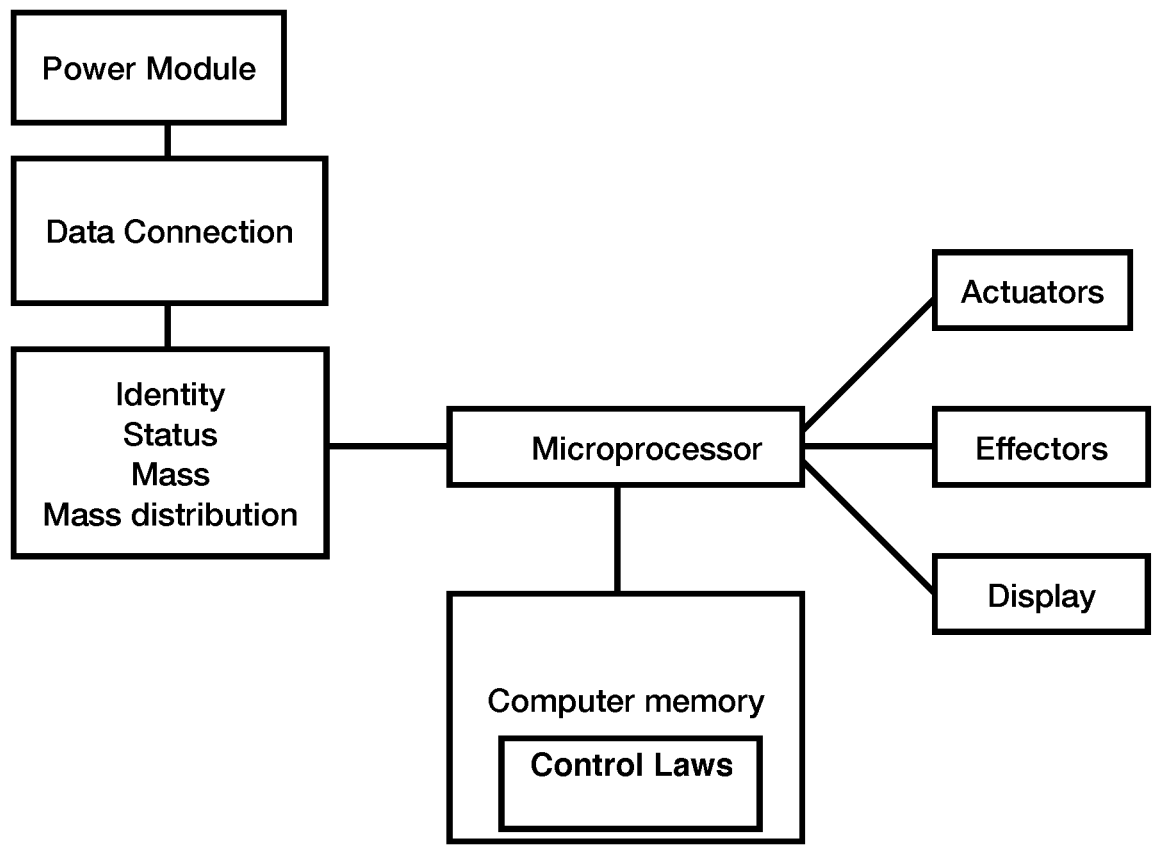

FIG. 31 is a schematic view of the aircraft control system.

IV. DESCRIPTION OF AN EMBODIMENT

The power module system of the invention includes an aircraft 2 (FIGS. 1-4) and a plurality of interchangeable power modules 14 (FIGS. 5-6F) that provide motive power to the aircraft 2. Each interchangeable power module 14 of the power module system may comprise any number of individual power modules 14. Where each power module 14 comprises a pair of power modules 38, 40, the system of the invention includes a plurality of pairs of power modules 38, 40. One of the pairs of power modules 38, 40 includes a power production apparatus that generates or stores power using a different technology from another of the pairs of power modules 38, 40. Where the power module 14 is a single power module 14 and does not comprise a pair or other number of power modules 38, 40, the system includes a plurality of power modules 14 where one of the power modules 14 includes a power production or storage apparatus that generates or stores power using a different technology than another power module 14 of the system.

A user may select among the plurality of interchangeable power modules 14 or pairs of power modules 38, 40 to select the technology that will power the aircraft 2, for example, based on the requirements of a mission or on the availability of fuel or other resources.

The figures and the discussion below address the Invention in the context of compound aircraft 4, but the discussion and Invention applies equally to all aircraft 2, including helicopters of any configuration, fixed wing aircraft having any configuration, and to lighter-than-air aircraft of any configuration. While the figures and discussion below address aircraft 2 with a pair of power modules 14 to provide motive power to the aircraft 2, the Invention applies to aircraft 2 having any number of power modules 14 to provide motive power, including one power module 14.

Figure 1:
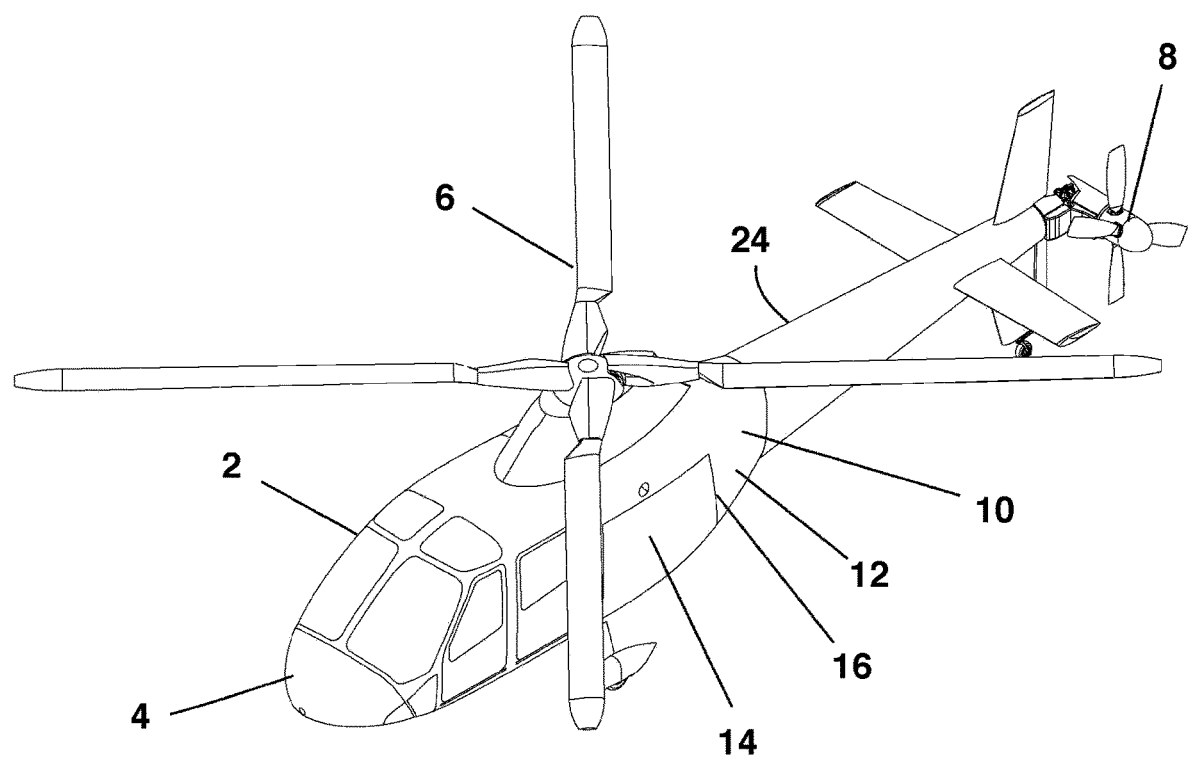
FIG. 1 is a perspective view of a single rotor helicopter of the Invention.

FIG. 1 is a perspective view of an example aircraft 2 of the Invention. The example aircraft 2 of FIG. 1 is compound aircraft 4 having a single main rotor 6 and a convertible thruster 8. The convertible thruster 8 has a reaction position, shown by FIG. 1, to react main rotor 6 torque. The convertible thruster 8 has a forward thrust position, shown by FIG. 2, to propel the compound aircraft 4 forward. The aircraft 2 has a fuselage 10 that defines an aircraft skin 12. When the aircraft 2 is flying through the air, the air through which the aircraft 2 flies moves across the aircraft skin 12 of the aircraft 2.

The aircraft 2 of FIG. 1 includes at least one power module 14. The power module 14 is selectably attachable to the aircraft 2 in an opening 16 in the fuselage 10 and FIG. 1 shows the power module 14 attached within the opening 16. The at least one power module 14 provides motive power to rotate the main rotor 6 and the convertible thruster 8 during takeoff, flight and landing. The power provided by the power module 14 may be either electrical power or mechanical power. The power module 14 is insertable into the opening 16 and removable from the opening as a modular assembly from outside of the interior volume of the fuselage 10 and without dismantling the fuselage 10 or the power module 14. The power module defines a power module skin 18. When the power module 14 is inserted into the opening 16, the power module skin 18 defines a portion of the aircraft skin 12 that is exposed to the air flowing across the aircraft 2 when the aircraft 2 is in flight.

Figure 2:
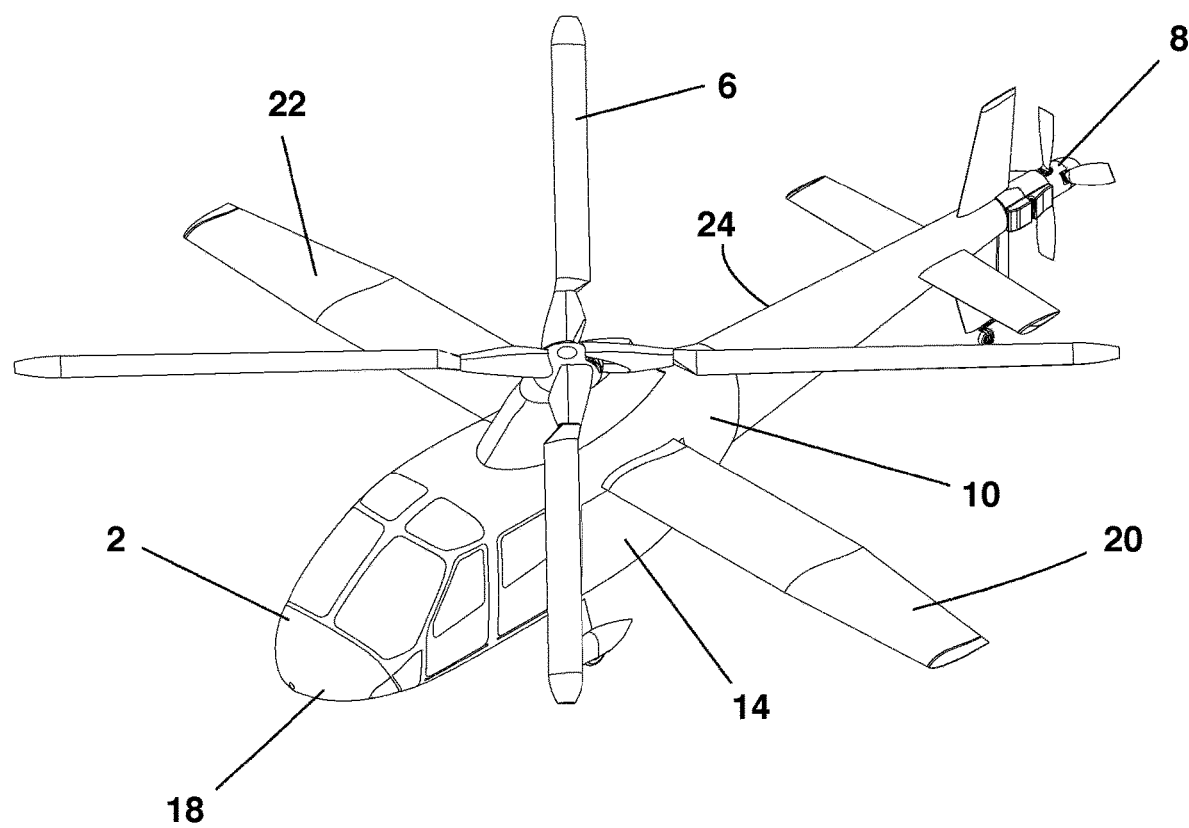
FIG. 2 is a perspective view of a compound aircraft of the Invention.

FIG. 2 shows the invention applied to a compound aircraft 4 having a wing. The compound aircraft 4 of FIG. 2 includes the convertible thruster 8 of FIG. 1 (shown in the forward trust position on FIG. 2) and also includes a port wing 20 and a starboard wing 22 that are attached to the fuselage 10. FIG. 2 shows the power module 14 inserted into the opening 16 in the fuselage 10 of the compound aircraft 4.

Figure 3:
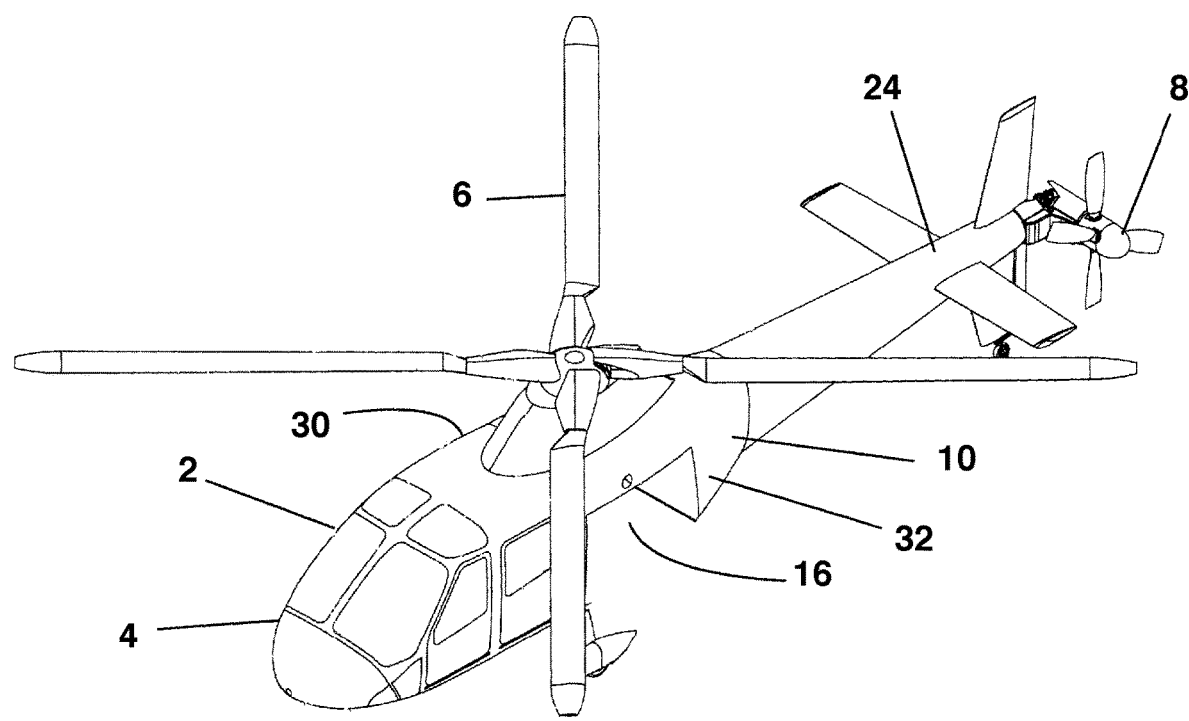
FIG. 3 is a perspective view of the single rotor helicopter of the Invention with the power modules removed.

FIG. 3 shows the compound aircraft 4 of FIG. 1 with the power module 14 removed from the opening 16 in the fuselage 10. As in FIG. 1, the convertible thruster 8 is shown in the reaction position to react the torque of the main rotor 6. The convertible thruster 8 is supported by a tail boom 24.

Figure 4:
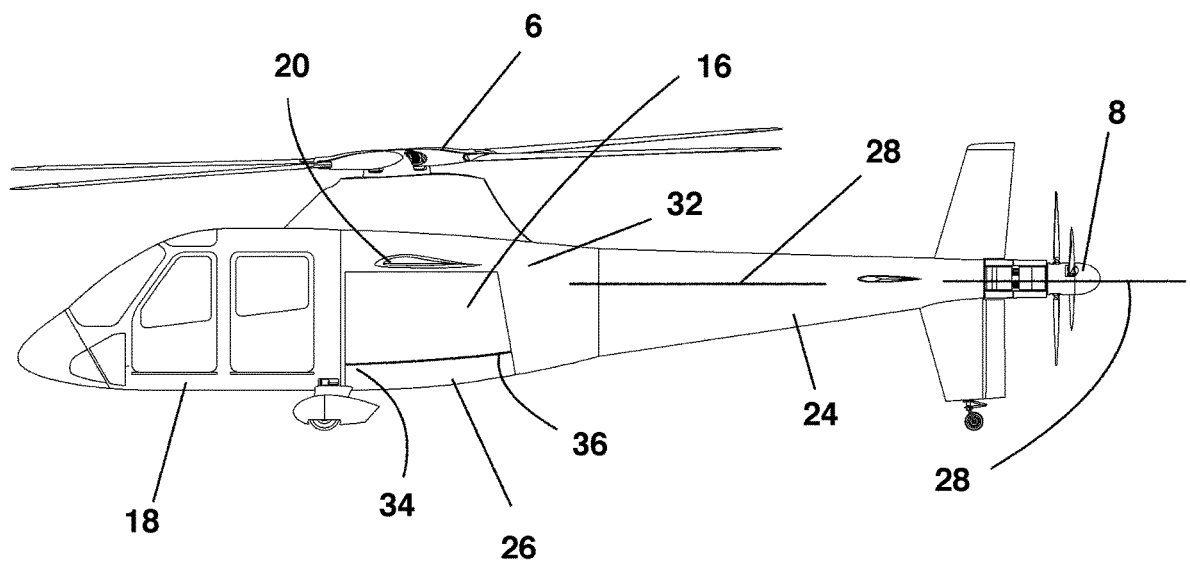
FIG. 4 is a side view of the compound aircraft of the invention with the power modules removed.

FIG. 4 is a side view of the compound aircraft 4 of FIG. 2 with the power module 14 removed from the opening 16. In the example of FIG. 4, the opening 16 communicates through the fuselage 10 from the fuselage port side 32 to the fuselage starboard side 30. Alternatively, the opening 16 may communicate only part of the distance through the fuselage 10. FIG. 4 also shows a central keel 26 that extends generally parallel to the longitudinal axis 28 of the aircraft 2 and along the center line of the aircraft 2 across the opening 16 at the ventral side of the fuselage 10. The central keel 26 is a structural member that resists flexural of the fuselage 10 along the longitudinal axis 28. The central keel 26 also provides forward keel connection points 34 and aft keel connection points 36 to connect the power module 14 to the central keel 26 and hence to the fuselage 10.

FIG. 5 is a perspective view of a pair of power modules 14, comprising a port power module 38 and a starboard power module 40. The port power module 38 is configured to be inserted into the opening 16 on the port side 32 of the fuselage 10. The starboard power module 40 is configured to be inserted into the opening 16 on the starboard side 30 of the fuselage 10. For an aircraft 2 configured to receive the pair of power modules 38, 40, the two power modules 38, 40 will provide an integrated, modular source of power to turn the main rotor(s) 6 and the convertible thruster 8 or a conventional tail rotor, or to otherwise provide power to move the aircraft 2 or to maintain the aircraft 2 in aerodynamic flight.

The power modules 38, 40 define power module connectors 42, including a power module forward keel connector 44 configured to connect to the forward keel connection point 34 of FIG. 4 and a power module aft keel connector 46 configured to connect to the aft keel connection point 36 of FIG. 4. The power modules 14 also include a forward beam connector 48 and an aft beam connector 50. The power module connectors 42 and the corresponding fuselage connection points 34, 36, 80, 82 are discussed below relating to FIGS. 7 through 18.

FIGS. 6A through 6G address alternative power production and delivery technologies for the power modules 14. In the system and method of the Invention, the user may select between power modules 14 providing power using two or more technologies, may install the selected power modules 14 using the selected technology, and may power the aircraft 2 using the selected power module 14 and the selected technology. To change the power generation or storage technology for the aircraft 2, the user simply selects and installs different power modules 14. While FIGS. 6A through G show a pair of power modules 38, 40, any number of power modules 14, including one power module 14, is contemplated by the Invention.

FIGS. 6A through 6D show power modules 38, 40 having power production apparatus using different technologies to provide electrical power to an electrically-powered aircraft 2. FIG. 6A is a cross section of the fuselage 10 and a pair of power modules 38, 40 that provide electrical power to an aircraft 2 that uses electric motors 102 housed within the fuselage 10 to power the main rotor 6 and convertible thruster 6, as shown by FIG. 19, infra. In the example of FIG. 6A, the electrical power production technology is a gas turbine engine 52 that powers an electrical generator 54. Both the gas turbine engine 52 and the electrical generator 54 are housed within the port power module 38. Fuel 56 for the gas turbine engine 52 is contained within the starboard power module 40. Plumbing connections for the fuel 56 join the port and starboard power modules 38, 40 when the power modules 38, 40 are installed in the opening 16 in the fuselage 10. An oil cooler 58 protects the gas turbine engine 52.

FIGS. 6Ba and 6Bb are perspective views of port and starboard power modules 38, 40 that contains fuel cells 60 to electrochemically generate electrical power. Fuel, such as hydrogen gas is stored in pressurized tanks 61 and passed through the anode of the fuel cell 60 and oxygen, such as atmospheric oxygen, is passed through the cathode. Protons from the hydrogen travel through a porous membrane, to the cathode. Electrons stripped from the protons at the anode move through the circuit, providing electrical power to the main rotor 6 and convertible thruster 8 as shown by FIG. 19. The protons react with the oxygen, producing water. Waste heat is collected and circulated through a pre-heater 66 to heat the fuel. FIG. 6Ba is a perspective view of the port and starboard power modules 38, 40. FIG. 6Bb is a detail view of the port and starboard power module 38, 40 with the structure of the power modules 38, 40 removed to better illustrate the fuel cell 60 components. FIGS. 6Ba and 6Bb show an intake 62 for air, manifolds 64 to distribute fuel to the cathodes of the fuel cell 60, and the fuel pre-heater 66.

Other than the technology to generate electrical power, the fuel cell system of FIGS. 6Ba and 6Bb are attached to the fuselage 10 and interact with the aircraft 2 in the same manner as the gas turbine hybrid system of FIG. 6A. The fuel cell system of FIGS. 6Ba and 6Bb is interchangeable with the gas turbine system of FIG. 6A.

FIG. 6C is a cross section of the fuselage 10 and a pair of power modules 38, 40 that provide electrical power to an aircraft 2 that uses electric motor(s) 102 housed outside the power modules 38, 40 to power the main rotor 6 and convertible thruster 6. In the example of FIG. 6C, the electrical power production technology is an internal combustion engine 118, such as a diesel piston engine or a gasoline-powered engine, that powers an electrical generator 54. Both the internal combustion engine 118 and the electrical generator 54 are housed within the port power module 38. Fuel 56 for the internal combustion engine is contained within the starboard power module 40. Plumbing connections for the fuel 56 join the port and starboard power modules 38, 40 when the power modules 38, 40 are installed in the opening 16 in the fuselage 10. A heat exchanger 120 eliminates waste heat produced by the internal combustion engine 118. The generator 54 provides power to the electric motor 102, as shown by FIG. 19.

The power module 14 of FIG. 6C is similar to FIG. 6A, except that the prime mover is an internal combustion engine 118, such as a diesel piston engine or a gasoline powered engine rather than a gas turbine 52. The power modules of FIG. 6C are interchangeable for the power modules of FIGS. 6A, 6Ba and 6Bb.

FIG. 6D is a cross section through the fuselage 10 and the port and starboard power modules 38, 40 where the power modules 38, 40 contain batteries 122 comprising multiple electrochemical cells. The batteries 122 electrically connect to the fuselage 10 when the power modules 38, 40 are installed to provide electrical power to electric motors 102 to turn the main rotor 6 and the convertible thruster 8. The battery system of FIG. 6D is interchangeable with the power modules 38, 40 of FIGS. 6A, 6Ba and 6Bb, and 6C. Capacitors that store electric power between charged plates may be substituted for the batteries 122 of FIG. 6D.

FIGS. 6E and 6F illustrate power modules 38, 40 that provide mechanical power to the aircraft 2. FIG. 6E is a section view through the fuselage 10 and the port and starboard power modules 38, 40 and illustrates that the power transfer from the power modules 14 to the main rotor 6 may be mechanical rather than electrical. In FIG. 6E, an internal combustion engine 118 or a gas turbine engine 52 turns an output shaft 124. The output shaft 124 mates with a corresponding input shaft 126 on the fuselage 10 when the power modules 14 are installed in the fuselage 10. The input shaft 126 in turn transmits rotary power through a gear train 128 and shaft to the rotor transmission 130. The rotor transmission 130 changes the speed of rotation to one suitable for the main rotor 6 and turns the rotor 6. A power takeoff (not shown) powers the convertible thruster 8 or conventional tail rotor.

FIG. 6F is a section view through the fuselage 10 and port and starboard power modules 38, 40 and illustrates that an electric motor 102 to drive the main rotor 6 may be housed within a power module 14. In the example of FIG. 6F, the port power module contains an electric motor 102 that drives the mechanical output shaft 124, which mates to the mechanical input shaft 126 of FIG. 6E. The input shaft 126 drives gear train 128, rotor transmission 130 and main rotor 6. The port and starboard power modules 38, 40 also contain batteries 122 comprising multiple cells to power the electric motor 102.

The power modules 14 of FIGS. 6E and 6F are interchangeable and the main rotor 6 may be mechanically driven by an output shaft 124 from a power module 14 that generates power by any suitable mechanism. For example, the electric motor 102 of FIG. 6F contained within a power module 14 may be powered by a fuel cell 60 that is also contained within a power module 14, as shown by FIGS. 6Ba and 6Bb. The port and starboard power modules 38, 40 may be independently exchanged; for example, the battery 122-containing starboard power module 40 of FIG. 6F may be swapped for a fuel-cell 60 or gas turbine 52 starboard power module 40 to drive the electric motor 102 in the port power module 38. As alternatives, the power modules 38, 40 conveying mechanical power through a rotating output shaft 124 may be powered by a compressed or coiled spring, by a compressed gas engine or by a rotating mass in a momentum engine.

FIG. 6G illustrates that the aircraft 2 may be configured to accept either or both mechanical power and electrical power from a power module 14. FIG. 6G is a section through the fuselage 10 with the power modules 14 removed. The aircraft 2 of FIG. 6G includes a mechanical input shaft 124, gear train 128 and main rotor transmission 130. The aircraft 2 of FIG. 6G thus is equipped to accept mechanical rotary power from a power module 14 in the same manner as the aircraft of FIGS. 6E and 6F. The aircraft 2 of FIG. 6G also is configured to accept electrical power from the power module 14 through cables 100 as shown by FIG. 19 and includes an electric motor 102 housed in the fuselage 10 and configured to drive the main rotor 6 through the rotor transmission 130 in the same manner as the aircraft 2 of FIGS. 6A through 6D. The aircraft 2 of FIG. 6G may interchangeably accept both power modules 14 that provide an electrical output and those that produce a rotating shaft mechanical output.

FIGS. 7-18 address the mechanisms for mechanically and electrically connecting the power module(s) 14 to the fuselage 10. FIGS. 7 and 8 are side and front views, respectively, of the forward keel connection point 34 or the aft keel connection point 36 for connecting the power module 14 to the central keel 26, shown by FIGS. 4 and 6A. The forward and aft keel connection points 34, 36 engage with the power module forward and aft keel connectors 44, 46 (see FIG. 5) to secure the power module 14 at those locations. The forward and aft keel connection points 34, 36 include a tapered bushing 68 to engage with the corresponding power module keel connectors 44, 46. the use of the tapered bushing allows imprecision in the alignment of the corresponding keel connection points 34, 36 and the power module keel connectors 44, 46 during installation of the power module 14 in the fuselage 10.

FIGS. 9 and 10 address the forces acting on the power modules 14. FIG. 9 shows the forces acting on the power module connectors 42. FIG. 10 is section A-A of FIG. 9. FIG. 10 shows an axially-free bushing 70 located at the power module aft beam connector 50. The axially-free bushing 70 also is located at the power module forward beam connector 48. The axially-free bushing 70 provides that a mounting latch 72 connecting the axially free bushing 70 and hence the power module 14 to the structural beam 74, 132 is free to move in the 'X' direction, which is parallel to the longitudinal axis 28 of the aircraft 2. The power module forward and aft beam connectors 48, 50 therefore do not apply force to the power module 14 in the 'X' direction, but do apply force to the power module 14 in the 'Y' and 'Z' directions. The 'Y' direction is lateral to the aircraft longitudinal axis 26 and the 'Z' direction is vertical. The axially-free bushings 70 provide that the mounting latches 72 (see FIGS. 12, 13, and 15) connecting the power module forward and aft beam connectors 48, 50 and the structural beams 74, 132 have an angular freedom of movement 'x' The combination of axial freedom of movement and angular freedom of movement avoids transfer of certain loads from the power module 14 to the fuselage 10 and from the fuselage 10 to the power module 14. The result is that the power module 14 and fuselage 10 can be lighter than would otherwise be the case. Loads in the 'X' direction, such as crash loads, are supported by the power module forward and aft keel connectors 44, 46 and by the forward and aft keel connection points 34, 36 (FIG. 4).

FIGS. 11 and 12 are a detail section end view and a cutaway side view of a portion of the mechanism to secure the power module 14 to the fuselage 10. FIG. 11 is the end view. The central keel 26 and the port structural beam 74 support the port power module 38 by the power module connectors 42. Rods 76 and bell cranks 78 move mounting latches 72 into and out of engagement with the power module connectors 42 and keel connection points 34, 36 and the forward beam connection point 80 and the aft beam connection point 82, selectably securing the power module 14 to the fuselage 10. A lever 84 operates the rods 76, bell cranks 78 and mounting latches 72. The lever 84 is shown by FIG. 18. A mirror image of the mechanism for the port power module 38 secures the starboard power module 40 to the fuselage 10.

FIG. 13 shows an example mechanical and electrical connection mechanism of the port power module 38 to the fuselage 10 at the port structural beam 74. The port structural beam 74 is located directly above the opening 16 to receive the port power module 38. Rods 76 and a bell crank 78 attached to the port power module 38 move mounting latches 72 to engage and disengage the port structural beam 74. For an electrically-powered aircraft 2, the same rods 76 and bell crank 78 may also move high voltage, high current electrical connectors 86 into and out of engagement with corresponding electrical connectors from the fuselage 10, to transfer electrical power from the power module 38 to the fuselage 10. FIG. 13 shows the high voltage, high power electrical connectors 86 connected by wires to a voltage inverter 90 to transform the DC power from the power module 14 into AC power for use by motors 102 driving the main rotor 6 and the convertible thruster 8 or conventional tail rotor (not shown). The voltage inverters 90 is discussed with respect to FIG. 19 below.

FIGS. 14A and 14B show a detail end view and detail side view of an example electrical connector 86 between the power module 14 and the fuselage 10. FIG. 14B is section A-A of FIG. 14A. From FIG. 14A, the high voltage, high current electrical connector 86 is located adjacent to the forward beam connection point 80 or the aft beam connection point 82 and in a common structure 81 that is substantially rigid. Co-locating the electrical and mechanical connections in a substantially rigid common structure 81 reduces relative movement of the two sides of the electrical connection and therefore provides a reliable electrical connection while allow allowing the power module 14 to be lighter than would otherwise be the case. From FIG. 14B, resilient contracts 91, such as flat springs, create robust electrical connection between an electrically charged pin 88 of the power module 14 and the corresponding electrical connection 86 of the fuselage 10. Arc shields 89 prevent arc flashes when the electrical pin 88 is inserted or removed from the electrical connectors 86 or in the event of momentary power interruptions.

FIG. 15 is section B-B of FIG. 14A and shows a tapered mounting latch 72 mechanically connecting the power module 14 to the structural beam 74 at the common structure 81. FIG. 15 does not show the axially-free bushing 70 of FIG. 10 and is an alternative embodiment. The tapered mounting latch 72 allows imprecision in the alignment between the power module 14 and the beam connection points 80, 82.

FIGS. 16 and 17 show a side section view (FIG. 16) and an end sectional view (FIG. 17) of the electrical and mechanical connection of the power module 14 to the structural beam 74. FIG. 16 is section C-C of FIG. 17 and differs from previous figures in that it shows a data connection 92 between the power module 14 and the fuselage 10. The data connection 92 may be electrical but also may be optical, as by using adjacent optical data couplers 94. The mating optical data couplers 94 are not required to touch and are much more resistant to signal interruption due to vibration than electrical connectors.

FIG. 18 is a schematic view of the internal structure of the power module 14 connection and communication mechanisms. A lever 84 is connected by rods 76 and bell cranks 78 to mounting latches 72 (see FIG. 15) and to electrical pins 88. The lever 84 has an engaged position and a disengaged position. When a user moves the lever to the engaged position, the lever moves mounting latches 72 and electrical pins 88 into engagement with beam connection points 80, 82 and keel connection points 34, 36, securing the power module to the fuselage 10 and connecting the electrical pins 88 to the high voltage, high power electrical connectors 86. When the user moves the lever 84 to the disengaged position, the mounting latches 72 disengage from the module connection points 80, 82, 34, 36 and the electrical pins 88 disengage from the electrical connectors 86. With the mounting latches 72, 88 out of engagement, the power module 14 is completely disengaged from the fuselage 10 and can be removed from the fuselage 10.

Also shown by FIG. 18 is an interlock 96. The interlock 96 prevents the electrical pins 88 from being energized when the lever 84 is in the open position. The interlock 96 may comprise a relay operated by a low-voltage switch 98 that is activated by the position of the lever 84. Additional interlocks 96 may be provided; for example, a service interlock activated by a technician to work on the power module 14 when the power module is installed on the fuselage 10.

As shown by FIG. 18 and FIG. 31, the data connection 92 may communicate operational parameters such as identity and status of the power module 14 to the aircraft control system and may communicate commands from a human pilot or from an autonomous control system to the power module 14. The aircraft control system is shown schematically by FIG. 31. The attached power module 14 communicates through the data connection 92 with a control system microprocessor. The microprocessor may receive the identity, status, mass and mass distribution of the power module 14. The microprocessor is configured to consult computer memory and to adjust the pilot display, the control effectors and control actuators as appropriate for the attached power module 14. The microprocessor also may adjust the aircraft effectors and commands to the power module actuators to correspond to the identity, status, and characteristics of the installed power module 14. For example, for a power module 14 including a turbine engine powered generator (see FIG. 6A), the aircraft control system may monitor the voltage, current, turbine temperature, oil pressure, and fuel supply. For a power module 14 powered by a storage battery (FIG. 6D), the control system may monitor the battery cell temperature, current, voltage, and state of charge.

Also from FIG. 31, the control system microprocessor may be configured to apply control laws to govern the flight of the aircraft, as is known in the art, and may adjust those control laws based on the identity of the attached power module 14 and based on the characteristics of the power module 14. For example, the mass and mass distribution of the power modules 14 will differ between power modules 14 that utilize different technologies. For some power modules, for example power modules 14 that use liquid or gaseous fuels 56, the mass and mass distribution of the power module will change during flight as the fuel 56 is consumed. The aircraft control system may adjust the control laws based on the identity of the attached power module 14 and based on the change is mass and mass distribution as detected or inferred by the aircraft control system. For example, the control system may infer a mass distribution of a power module 14 that utilizes liquid fuel 56 based on the measured amount of fuel 56 remaining on board the power module 14. The control microprocessor will use the changed control laws to, for example, adjust the control effector and control actuator positions for coordinated flight.

FIG. 19 is a schematic representation of the electrical rotor drive components disposed within the fuselage 10 of an electrically-powered rotary-wing aircraft 2 of the Invention. One or more power modules 14 provides high voltage, high current DC electrical power through cables 100 to a plurality of electrical inverters 90 wired in parallel. While FIG. 19 shows two inverters 90, the aircraft 2 may include more than two inverters 90, for example four or eight inverters. Multiple small inverters 90 may cost less than a smaller number of relatively large inverters 90 and offer no weight or space penalties. The plurality of inverters 90 offers redundancy and reduces the risk of a complete power loss in the event of inverter 90 failure. The inverters 90 transform the DC electric power from the power modules to AC electric power. The inverters 90 can control the frequency of the AC electric power to control the speed of rotation of the rotor 6. The inverters 90 feed the AC electrical power to one or more AC electric motors 102. The electric motor 102 powers a mechanical rotor transmission 130 that changes the rotational speed of the electric motor 102 to a speed appropriate for the rotor 6. A similar system to the above provides electrical power to an electric motor 102 powering the convertible thruster 6.

FIG. 20 is a schematic representation of certain embodiments of the power module 14 and its relation to the aircraft 2. The power module 14 may store electrical power, as in the case of a storage battery 122 or a capacitor energy storage device. The power module 14 may generate electricity through the combustion of fuel 56, such as a gas turbine 52 coupled to an electrical generator 54 or an internal combustion engine 118 coupled to a generator 54. The power module 14 may generate electrical power electrochemically, as by a fuel cell 60. Alternatively, the power module 14 may generate mechanical power to turn an output shaft 124. For example, the prime mover turning the mechanical drive may be a gas turbine 52 or an internal combustion engine 118. The fuselage 10 may receive the mechanical power and transmit the mechanical power to the rotor 6 by way of an input shaft 126. The power module and aircraft control system may exchange data through a data interface, such as optical couplers 94. From FIG. 20, the power module is secured to the fuselage with a mechanical interface. A data interface, for example optical couplers 94 may allow the exchange of data between the power module 14 and the aircraft control system.

FIG. 21 provides information similar to FIG. 20, except from the point of view of the interface between the power module 14 and the fuselage 10. Below the interface design box are various mechanisms to generate or store electrical power than may be utilized a power module 14 or a combination of power modules 14. Above the interface design box are what must be conveyed through the interface. The first is high voltage, high current electrical power for a power module 14 providing electrical power. The second is communication, for example the status of the power module 14, state of charge of a battery 122 comprising the power module, fuel 56 levels for a gas turbine 56, exhaust gas temperature of the gas turbine 52, and any other information about the power module 14 that the operator may find useful. The third signal to cross the power module 14-fuselage 10 interface are commands from the aircraft 2 control system to the power module 14.

FIGS. 22 through 26 describe a ground handling system 104 for moving the power module(s) 14 into and out of engagement with the fuselage 10 and for maneuvering the power modules 14 when the power modules 14 are not mounted to the fuselage 10. FIG. 22 illustrates the process for removing a power module 14 from the fuselage 10. FIG. 23 is a sectional side view of the wheeled cart 106 supporting the power module 14 in engagement with the fuselage 10. FIG. 24 is a perspective view of the wheeled cart 106 supporting a power module 14. FIG. 26 is a detail side view of the wheeled cart 106 and power module 14 showing a rotatable arm 116 and support system 112. FIG. 25 is detail A-A of FIG. 26 showing the ground handling system support 112 in engagement with the power module 14.

From FIGS. 22 through 26, the ground handling system 104 comprises a wheeled cart 106 that may be equipped with a lift 108. The lift 108 is configured to raise and lower the power module 14 when the power module 14 is supported by the cart 106. The lift 108 may be in the form of four rotatable arms 116 that engage corresponding power module lift points 110. FIGS. 22 and 23 show the process of removing a power module 14 from the fuselage 10. The wheeled cart 106 is rolled to the aircraft 2 (left panel of FIG. 22) and the arms 116 are rotated as indicated by the arrows on FIG. 23 so that the ground handling system supports 112 are in contact with the power module lift points 110 (FIG. 23). The support pins 114 of the ground handling system supports 112 engage corresponding openings in the power module lift points 110. The power module lift points 110 are adjacent to the power module keel connectors 44, 46 and the power module beam connectors 48, 50. Co-locating the power module lift points 110 and the keel and beam connectors 44, 46, 48, 50 allows the relatively stiff keel and beam connectors 44, 46, 48, 50 to serve more than one purpose and allows the power module 14 to be lighter than would otherwise be the case. The rotatable arms 116 are rotated to lift the power module 14 and to unweight the fuselage 10 and aircraft landing gear. The power module 14 is released from the fuselage 10 by throwing the lever 84, shown by FIG. 18. The interlock 96 disengages automatically, preventing high voltage electrical power to the power module 14 electrical pins 88. The wheeled cart 106 may then be wheeled to a desired location and the power module 14 lowered, as to a storage support, by rotating the arms 116.

The power module lifting points 110 are not all on the same plane so that when the ground handling system supports 112 and power module lifting points 110 are in engagement, the power module 14 may be mechanically locked to the ground handling system 104. Otherwise, the weight of the power module 14 holds the power module 14 in place on the wheeled cart 106.

To install the power module 14 on the fuselage, the user rolls the wheeled cart 106 and power module 14 into position adjacent to and below the opening 16 in the fuselage 10. The user rotates the rotatable arms 116 to raise the power module 14 and to place the power module 14 connection points 42 into engagement with the beam connection points 80, 82 and the keel connection points 34, 36. The user can then throw the lever 84, locking the power module 14 to the fuselage 10 at the connection points 42. The arms 106 of the lift 108 then are then rotated out of engagement with the power module lift points 110 and the lift 108 lowered. Installation is complete and the user rolls the ground handling system 104 away from the aircraft 2.

The power module lift points 110 are physically located in close proximity to the power module connectors 42. Co-location of the power module lift points 110 and connection points 42 reduces the required structural strength of the power module 14, and hence reduces the weight of the power module 14. The lift 108 may comprise pivoting arms, as shown by FIGS. 23-26, or may utilize any other suitable technology, for example a hydraulic jack, a screw jack or a scissors jack.

The following relates to FIGS. 27 through 30. Each power module 14 is stiff and heavy while the fuselage 10 of the aircraft 2 is light and flexible. In normal operation, the fuselage 10 will move and flex in flight. Attaching the stiff, heavy power modules 14 to the flexible fuselage 10 will cause the fuselage 10 to flex in response to static and dynamic loads on the fuselage 10 from the power modules 14. Such flexing is unavoidable absent adding undesirable weight to the fuselage 10 to increase its stiffness. Flexing of the fuselage 10 and the resulting relative motion between the power module 14 and fuselage 10 can cause interruption in monitoring and control signals between the fuselage 10 and the power module 14. The relative motion between the fuselage 10 and power module 14 also can cause interruption in the flow of electric power from the power module 14 to the electric motors 102 powering the aircraft 2.

A solution described above and shown by FIGS. 27-30 is to co-locate the power module connectors 42, particularly the power module forward and aft beam connectors 48, 50, with the high voltage, high power electrical connectors 86 and the data connectors 52. FIG. 27 shows the opening 16 in the fuselage 10 to receive the power modules 14 and shows a substantially rigid reinforcing members 134 reinforcing the forward and aft keel keel connectors 44, 46. FIG. 28 is section D-D of FIG. 27. FIG. 29 is detail D of FIG. 27. FIG. 30 is section E-E of FIG. 27.

From FIGS. 27-30, the power module forward and aft beam connectors 48, 50 are connectable to the forward and aft beam connection point 80, 82. The forward and aft beam connection points 80, 82 are hard-points supported by the port structural beam 74 and the starboard structural beam 132. The substantially rigid reinforcing members 134 reinforce the power module 14 and prevent relative motion between the data connectors 52, the high voltage, high power electrical connectors 86 and the power module connectors 42 when the power module 14 is attached to the fuselage 10. The substantially rigid reinforcing members 134 prevent interruption of the monitoring and control signals and prevent interruption of electric power from the power module 14 to the fuselage 10.

FIG. 27 is a detail side view of the aircraft 2, in this case a compound aircraft 4 having a main rotor 6 with the power modules 14 removed. The power module 14 may be disposed within an opening 16 in the fuselage 10. The power module 14 is held in place by the interaction between power module connectors 42 and forward and aft structural beam connection points 80, 82 and forward and aft keel connection points 34, 36, as described above relating to FIGS. 7 through 18.

FIG. 28 is a cross section D-D from FIG. 27 looking forward and showing the port and starboard structural beams 74, 132, the forward structural beam connection points 80, and forward keel connection points 34, and substantially rigid reinforcing member 134. Substantially rigid reinforcing members 134 support the power module forward beam connection points 48 and the power module forward keel connection points 44. Substantially rigid reinforcing members 134 also support the high voltage, high power electrical connectors 86 and the data connection 92, not shown.

FIG. 29 is detail 'D' of FIG. 27. FIG. 29 shows the aft keel connection point 36 of the central keel 26. The power module aft keel connector 46, which is supported by the substantially rigid reinforcing member 134 (shown in side view on FIG. 29) engages with the aft keel connection point 36 to support the power module 14 on the central keel 26.

FIG. 30 is cross section E-E of FIG. 27 and shows the port and starboard structural beams 86, 132 showing the power module aft beam connectors 46 supported by substantially rigid reinforcing members 134. The substantially rigid reinforcing members 134 also support the high voltage, high power electrical connectors 86 and the data connectors 92, not shown.

FIG. 31 is discussed above in the discussion of FIG. 18.

While the above description and the figures show separate port and starboard power modules 38, 40, as an alternative the port and starboard power modules 38, 40 may be combined into a single power module 14 that spans the port and starboard sides 32, 30 of the aircraft 2. Such a power module 14 may include the central keel 26 as an integral part of the power module 14 so that the central keel is removed and installed as a part of the power module 14. Structural fore and aft connectors releasably attach the integral central keel 26 to the fuselage. A separate central keel 26 that is not integral with the power module 14 and that is removable and replaceable may provide structural strength to the fuselage 10 when the power module 14 is not attached.

In this document and in the drawings, elements labeled with a common element number refer to the same element unless the context requires otherwise.

The following is a list of the numbered elements included in the specification and drawings:

aircraft 2
compound aircraft 4
main rotor 6
convertible thruster 8
fuselage 10
aircraft skin 12
power module 14
opening 16 in the fuselage
port wing 20
starboard wing 22
tail boom 24
central keel 26 longitudinal axis 28
starboard side of the aircraft 30
port side of the aircraft 32
forward keel connection points 34
aft keel connection points 36
port power module 38
starboard power module 40
power module connectors 42
power module forward keel connection point 44
power module aft keel connection point 46
power module forward beam connection point 48
power module aft beam connection point 50
gas turbine engine 52
generator 54
fuel 56
oil cooler 58
fuel cell stack 60
filter 62
plenum 64
fuel preheater 66
tapered bushing 68
axially free bushings 70
mounting latches 72
port structural beam 74
rods 76
bell cranks 78
forward structural beam connection point 80
Common structure 81
aft structural beam connection point 82
lever 84
high voltage, high-powered electrical connectors 86
electrical pin 88
inverter 90
data connection 92
optical couplers 94
interlock 96
switch 98
cables 100
electric motor 102
ground handling system 104
wheeled cart 106
lift 108
power module lift points 110
ground handling system support 112
support pin 114
arm 116
internal combustion engine 118
heat exchanger 120
batteries 122
output shaft 124
input shaft 126
gear train 128
rotor transmission 130
starboard structural beam 132
Substantially rigid reinforcing member 134

What is claimed is:

1. A power module system of an aircraft having a fuselage wherein the fuselage includes an aircraft drive system, the power module system comprising:
  a) a first power module comprising a first port power module and a first starboard power module, the first port power module and the first starboard power module being selectably attachable to and detachable from the fuselage, the first power module defining a first power-production apparatus, the first power production apparatus having a configuration to generate or to store a first power for the aircraft using a first technology when the first port power module and the first starboard power module are attached to the fuselage, the first power being adequate to aerodynamically support the aircraft in flight or to provide motive power to the aircraft using the aircraft drive system when the aircraft is flying, the first power module having a configuration to convey the first power to the aircraft drive system when the first power module is attached to the fuselage;
  b) a second power module comprising a second port power module and a second starboard power module, the second power module being selectably attachable to and detachable from the fuselage, the second power module defining a second power production apparatus, the second power production apparatus having a configuration to generate or to store a second power using a second technology when the second power module is attached to the fuselage, the second technology being different from the first technology, the second power being adequate to aerodynamically support the aircraft in flight or to provide motive power to the aircraft using the aircraft drive system when the aircraft is flying, the second power module have a configuration to convey the second power to the aircraft drive system when the second power module is attached to the fuselage, the second power module being interchangeable with the first power module;
  c) a longitudinal axis defined by the fuselage, the fuselage further defining a port opening located on a port side of the fuselage and a starboard opening on a starboard side of the fuselage, the port opening and the starboard opening each having a top side and a bottom side, the fuselage having a configuration to receive and retain the first port power module or the second port power module in the port opening, the aircraft having a configuration to receive and retain the first starboard power module or the second starboard power module in the starboard opening, the configuration of the aircraft to receive and retain the first port power module or the second port power module and the first starboard power module or the second starboard power module comprising:
  d) a central keel, the central keel being elongated and oriented generally parallel to the longitudinal axis of the fuselage and located along the bottom side of the port opening and the starboard opening, the central keel defining a port forward keel connection point, a port aft keel connection point, a starboard forward keel connection point, and a starboard aft keel connection point;
  e) a port structural beam, the port structural beam being generally parallel to the longitudinal axis of the fuselage and disposed at the top side of the port opening, the port structural beam defining a port forward beam connection point and a port aft beam connection point;
  f) a starboard structural beam, the starboard structural beam being generally parallel to the longitudinal axis of the fuselage and disposed at the top side of the starboard opening, the starboard structural beam defining a starboard forward beam connection point and a starboard aft beam connection point;
  g) each of the first power module and the second power module defining a plurality of connectors, the plurality of connectors being configured to selectably engage the port forward keel connection point, the port aft keel connection point, the starboard forward keel connection point, the starboard aft keel connection point, the port forward beam connection point, the port aft beam connection point, the starboard forward beam connection point, and the starboard aft beam connection point to selectably secure the first power module or the second power module to the fuselage.

2. The power module system of claim 1, wherein the port forward keel connection point, the port aft keel connection point, the starboard forward keel connection point, the starboard aft keel connection point, the port forward beam connection point, the port aft beam connection point, the starboard forward beam connection point, and the starboard aft beam connection point each includes a connection point opening, and wherein the plurality of connectors for each of the first port power module, the first starboard power module, the second port power module and the second starboard power module comprise:
  a) at least four mounting latches, each of the mounting latches corresponding to a one of the connection point openings, the at least four mounting latches being configured to selectably slide substantially parallel to the aircraft longitudinal axis to selectably penetrate the corresponding connection point opening to engage or disengage the first port power module, the first starboard power module, the second port power module or the second starboard power module;
  b) a hand lever located on the first port power module, the first starboard power module, the second port power module or the second starboard power module, the hand lever being movable by a user, the hand lever being mechanically linked to the at least four mounting latches to selectably slide the at least four mounting latches into and out of engagement with the corresponding connection point openings to selectably attach and detach the corresponding first port power module, the first starboard power module, the second port power module or the second starboard power module from the aircraft by the user moving the lever.

3. The power module system of claim 1, wherein the port forward beam connection point, the port aft beam connection point, the starboard forward beam connection point, and the starboard aft beam connection point each includes an axially-free bushing, each axially-free bushing allowing motion of a corresponding connector of the plurality of connectors in an axial direction parallel to the longitudinal axis of the fuselage, each axially-free bushing substantially preventing motion of the corresponding connector of the plurality of connectors normal to the axial direction.

4. The power module system of claim 3, wherein each axially-free bushing is a spherical bushing or a prolate bushing, each of the spherical bushings or the prolate bushings allowing an angular motion of the port forward beam connection point, the port aft beam connection point, the starboard forward beam connection point, and the starboard aft beam connection point.

5. The power module system of claim 2, wherein at least one of the first port power module and the first starboard power module and at least one of the second port power module and the second starboard power module include a plurality of electrical connectors, the electrical connectors being configured for a selectable electrical connection to convey the first power or the second power, each of the electrical connectors is configured to slide substantially parallel to the longitudinal axis of the fuselage, the electrical connectors being mechanically linked to the corresponding hand lever, whereby the user may electrically connect and electrically disconnect the first port power module, the first starboard power module, the second port power module or the second starboard power module from the fuselage by moving the corresponding hand lever between a disengaged position and an engaged position.

6. The power module system of claim 5, the power module system further comprising: an interlock operably connected to the corresponding hand lever for the at least one of the first port power module and the first starboard power module, and for the at least one of the second port power module and the second starboard power module, the interlock being configured to selectably energize the plurality of electrical connectors only if the corresponding hand lever is in the engaged position.

7. The power module system of claim 5, wherein the selectable electrical connection has a configuration for resilience, the configuration for resilience comprises a spring or an elastomer engaging a one of the plurality of electrical connectors and allowing relative motion between the one of the plurality of electrical connectors and the fuselage.

8. The power module system of claim 1, the power module system further comprising: a data connection, the data connection linking the first power module or the second power module and an aircraft control system when the first power module or the second power module is attached to the fuselage, the data connection being configured to convey data between the first power module or the second power module and the aircraft control system.

9. The power module system of claim 8, the data connection comprising: a power module optical coupler and an aircraft optical coupler, the power module optical coupler and the aircraft optical coupler being immediately adjacent and in optical communication when the first power module or the second power module is attached to the fuselage.

10. The power module of system of claim 9, wherein the power module optical coupler and the aircraft optical coupler are located adjacent to the port forward beam connection point, to the port aft beam connection point, to the starboard forward beam connection point, or to the starboard aft beam connection point.

11. The power module system of claim 1, wherein the port opening and the starboard opening are not covered by an access panel, whereby a user is not required to remove the access panel to install or remove the first power module or the second power module.

12. The power module system of claim 11, wherein each of the first power module and the second power module defines a power module skin, the power module skin is configured so that an air flows over the power module skin when the first power module or the second power module is attached to the fuselage and the aircraft is flying through the air.

13. The power module system of claim 1, wherein the first power module and the second power module are two of a plurality of power modules, each of the plurality of power modules being interchangeable for each other of the plurality of power modules.

14. The power module system of claim 1, the power module system further comprising: an aircraft control system configured for a control of the aircraft, the aircraft control system having a configuration to identify the first power module or the second power module that is attached to the fuselage, the aircraft control system being configured to conform the control of the aircraft to the first power module or the second power module that is attached to the fuselage.

15. The power module system of claim 14, wherein the aircraft control system is configured to detect a status of the first power module or the second power module that is attached to the fuselage, the control system being configured to display the status to a pilot.

16. The power module system of claim 15, wherein the control system is configured to move one or more control actuators based on changes to one or more control effectors under a command of the pilot and wherein the control system is configured to adjust the control effectors and the actuators to correspond to the first power module or the second power module that is attached to the fuselage.

17. The power module system of claim 1, wherein the aircraft has a control system configured to apply a control law to control flight of the aircraft, the power module system further comprising: a data connection, the data connection linking the first power module or the second power module and the control system when the first power module or the second power module is attached to the fuselage, the data connection being configured to convey an identity of the first power module or the second power module to the control system when the first power module or the second power module is attached to the fuselage, the control system being configured to conform the control law to the first power module or the second power module that is attached to the fuselage.

18. The power module system of claim 17, wherein the first power module or the second power module has a mass and a mass distribution, the control system being configured to conform the control law based upon the mass and the mass distribution of the first power module or the second power module that is attached to the fuselage.

19. The power module system of claim 18, wherein the control system is an autonomous control system.

20. The power module system of claim 1, further comprising:
   a) a power module lift, the power module lift having a configuration to engage and to raise or lower each of the first port power module, the second port power module, the first starboard power module, or the second starboard power module with respect to the fuselage for attachment and detachment to or from the fuselage, the configuration of the power module lift to engage each of the first port power module, the second port power module, the first starboard power module, or the second starboard power module comprising:
   b) at least two lower lift pins configured to selectably engage the first port power module, the second port power module, the first starboard power module, or the second starboard power module;
   c) at least two upper lift pins, the two lift pins being configured to engage the first port power module, the second port power module, the first starboard power module, or the second starboard power module;
   d) a rotatable arm attached to the power module lift, the rotatable arm supporting the at least two upper lift pins, the rotatable arm being configured to rotate the at least two upper lift pins for engagement with the first port power module, the second port power module, the first starboard power module, or the second starboard power module.

21. The power module system of claim 1, wherein the configuration of the first power module and the second power module to convey the first power and the second power to the aircraft drive system is an electrical connection, and wherein the first technology is a one of an electrical storage battery, a fuel cell, a turbine-powered electrical generator, or an internal combustion engine-powered electrical generator, and wherein the second technology is another of the electrical storage battery, the fuel cell, the turbine-powered electrical generator, or the internal combustion engine-powered electrical generator.

22. The power module system of claim 1, wherein the configuration of the first power module and the second power module to convey the first power and the second power to the aircraft drive system is a mechanical connection comprising a rotatable shaft, wherein the first technology is a one of a turbine engine, an internal combustion engine, an electric motor, a compressed gas engine, or a momentum storage engine, and wherein the second technology is another of the turbine engine, the internal combustion engine, the electric motor, the compressed gas engine, or the momentum storage engine.

23. The power module system of claim 1, wherein the configuration of the first power module to convey the first power to the aircraft drive system is an electrical connection and wherein the configuration of the second power module to convey the second power to the aircraft drive system is a mechanical connection.

* * * * *